(12) United States Patent
Huang et al.

(10) Patent No.: US 9,820,297 B2
(45) Date of Patent: Nov. 14, 2017

(54) SMALL CELL DEPLOYMENT SCHEDULING

(71) Applicant: Taiwan Semiconductor Manufacturing Company, Ltd., Hsinchu (TW)

(72) Inventors: Ching-Yao Huang, Taiwan (CN); Chie-Ming Chou, Taiwan (CN)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 289 days.

(21) Appl. No.: 14/196,525

(22) Filed: Mar. 4, 2014

(65) Prior Publication Data
US 2015/0049681 A1    Feb. 19, 2015

Related U.S. Application Data

(60) Provisional application No. 61/916,754, filed on Dec. 16, 2013, provisional application No. 61/900,921, filed on Nov. 6, 2013, provisional application No. 61/866,352, filed on Aug. 15, 2013.

(51) Int. Cl.
| | |
|---|---|
| H04W 4/00 | (2009.01) |
| H04W 72/12 | (2009.01) |
| H04W 48/20 | (2009.01) |
| H04W 72/04 | (2009.01) |

(52) U.S. Cl.
CPC ....... *H04W 72/1278* (2013.01); *H04W 48/20* (2013.01); *H04W 72/1289* (2013.01); *H04W 72/048* (2013.01); *Y02B 60/50* (2013.01)

(58) Field of Classification Search
USPC .......................... 370/329, 330, 331, 333, 338
See application file for complete search history.

(56) References Cited

U.S. PATENT DOCUMENTS

| | | | |
|---|---|---|---|
| 2006/0045046 A1* | 3/2006 | Kim ..................... | H04W 52/146 370/329 |
| 2007/0060138 A1* | 3/2007 | Kwak .................. | H04W 28/22 455/445 |
| 2010/0177732 A1* | 7/2010 | Watanabe ............. | H04L 5/0007 370/330 |
| 2011/0292874 A1* | 12/2011 | Ho ........................ | H04W 52/42 370/328 |
| 2013/0023302 A1 | 1/2013 | Sivanesan et al. | |
| 2013/0044600 A1 | 2/2013 | Sridhar et al. | |

(Continued)

*Primary Examiner* — Zewdu A Beyen
(74) *Attorney, Agent, or Firm* — Haynes and Boone, LLP

(57) ABSTRACT

Data transmissions between a user equipment (UE) and a serving cell of a heterogeneous network (HetNet) are efficiently scheduled based on speed data associated with the UE. In one aspect, the UE can report its speed to a serving access point. Alternatively, the serving access point can estimate the UE's speed based on information received from core network devices. In addition, to extend the battery life of the UE, the UE can report power consumption constraint data to the serving cell, which in turn can utilize the consumption constraint data to facilitate the scheduling. Moreover, based on an analysis of the speed data and the power consumption constraint data, the serving access point can determine whether dual connectivity is to be implemented and/or whether communication data is to be transmitted via an Almost Blank Sub-frame (ABS) or a non-ABS.

47 Claims, 14 Drawing Sheets

(56) References Cited

U.S. PATENT DOCUMENTS

2013/0045740 A1 2/2013 Gayde et al.
2013/0281089 A1* 10/2013 Chandrasekhar ..... H04W 24/02
                                                       455/434
2014/0342748 A1* 11/2014 Zou ................... H04W 72/0426
                                                       455/452.1
2015/0009816 A1* 1/2015 Hsu ................... H04W 28/0221
                                                       370/230.1

* cited by examiner

SMALL CELL DEPLOYMENT SCHEDULING

CROSS-REFERENCE TO RELATED APPLICATION

This is a non-provisional application that claims priority to the following: U.S. Provisional Patent Application No. 61/866,352, entitled "METHOD AND APPARATUS FOR SMALL CELL DEPLOYMENT SCHEDULING", filed on Aug. 15, 2013; U.S. Provisional Patent Application No. 61/900,921, entitled "METHOD AND APPARATUS FOR SMALL CELL DEPLOYMENT SCHEDULING", filed on Nov. 6, 2013; and U.S. Provisional Patent Application No. 61/916,754, entitled "METHOD AND APPARATUS FOR SMALL CELL DEPLOYMENT SCHEDULING", filed on Dec. 16, 2013. Each of the above noted applications are incorporated herein by reference in their entirety.

TECHNICAL FIELD

The subject disclosure relates to wireless communications and, in particular, to small cell deployment scheduling.

BACKGROUND

Wireless service providers are observing an exponential growth in mobile communications due to both an increase in consumer demand and commercial requirements. To improve wireless coverage, and to offload traffic from a radio access network (RAN), wireless service providers are deploying small cells—small scaled wireless access points interfaced with a wired broadband network. Small cells together with macrocells form a heterogeneous network (HetNet), wherein a small cell and the microcells operate on the same set of frequencies and with overlapping geographical coverage. In this example scenario, a user equipment (UE), within the overlapping geographical coverage, determines a cell that it should camp on based on transmission power of signals received from the respective access points. For example, the UE can connect to the small cell when the received power from the small cell is larger than that received from the macro access point (e.g., $P_{small} > P_{macro}$). To compensate for the higher power transmitted by the macro access point and offset the loading of the macrocell, a Cell Range Extension (CRE) bias is added so that the UE chooses to connect to the small cell when $P_{small} > P_{macro} - P_{offset}$. However, introduction of CRE can increase interference and/or degrade communication quality at the UE.

BRIEF SUMMARY

The systems and methods disclosed herein relate to scheduling small cell deployment. A system, in accordance with one implementation, includes a serving access point device of a communication network that comprises a memory having stored instructions and a processor configured to execute the instructions to perform operations. In one aspect, the operations performed by the serving access point device comprise receiving scheduling data associated with a user equipment and facilitating a scheduling of a transmission between the serving access point device and the user equipment based on the scheduling data. A method, in accordance with one implementation, includes receiving, by an access point device of a communication network that comprises a processor, scheduling data associated with a user equipment, the scheduling data comprising speed data and facilitating a scheduling of a transmission between the access point device and the user equipment based on the scheduling data. According to another aspect, the systems and methods disclosed herein relate to a computer-readable storage device comprising computer-executable instructions that, in response to execution, cause a system comprising a processor to perform operations. The operations comprise determining scheduling data associated with a user equipment and directing the scheduling data to an access point device serving the user equipment to facilitate scheduling of a transmission between the access point device and the user equipment.

Yet another aspect relates to a mobile device that comprises a memory having stored instructions and a processor configured to execute the instructions to perform operations. As an example, the operations performed by the mobile device comprise determining scheduling data associated with the mobile device and directing the scheduling data to an access point device serving the mobile device to facilitate scheduling of a transmission between the access point device and the mobile device. A method, in accordance with one aspect, includes determining, by a mobile device that comprises a processor, scheduling data associated with the mobile device and directing the scheduling data to an access point device serving the mobile device to facilitate scheduling of a transmission between the access point device and the mobile device. According to still another aspect, the systems and methods disclosed herein relate to a computer-readable storage device comprising computer-executable instructions that, in response to execution, cause a system comprising a processor to perform operations. The operations comprise determining scheduling data associated with the mobile device and directing the scheduling data to an access point device serving the mobile device to facilitate scheduling of a transmission between the access point device and the mobile device.

DETAILED DESCRIPTION

Figure 1:
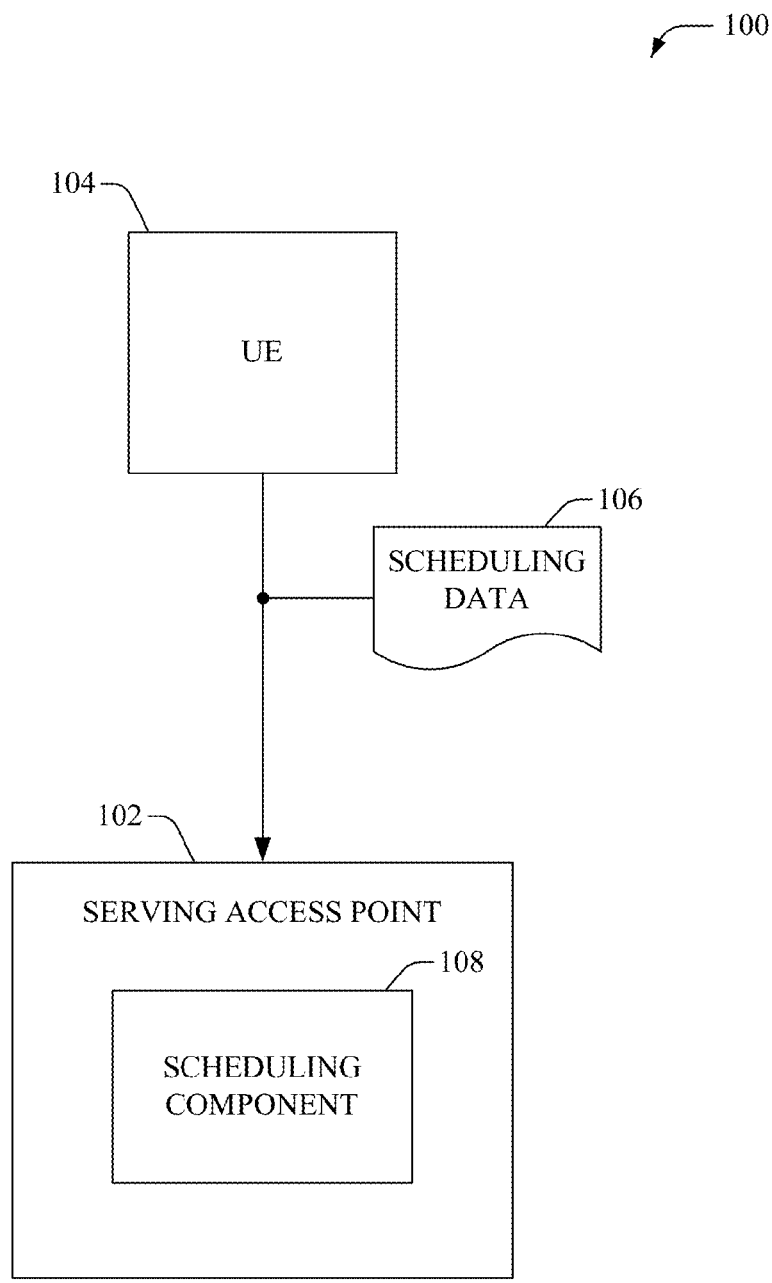
FIG. 1 illustrates an example system that facilitates efficient scheduling in a heterogeneous network (HetNet).

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service," "controller," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instructions, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the words "example" and "exemplary" are used herein to mean serving as an instance, or illustration. Any aspect or design described herein as "example" or "exemplary" is not necessarily to be construed as preferred or advantageous over other aspects or designs. Rather, use of the word example or exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," "subscriber station," "access terminal," "terminal," "handset," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives or transmits data, control, voice, video, sound, gaming, or substantially any data-stream or signaling-stream from or to a set of subscriber stations. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, the terms "macrocell" and "macro" are utilized interchangeably herein. The term "site" utilized herein refers to a cell site, for example, a location at which antennas (e.g., transmitter/receivers transceivers) and electronic communications equipment are placed. As an example, a cell site can typically include communications equipment to create a cell in a cellular network. The communications equipment can include an access point, a base station, a Node B, an evolved Node B, a home Node B (HNB), or the like.

Cell range extension (CRE) is adopted in Heterogeneous Networks (HetNets) to enable a user equipment (UE) to couple to the small cell aggressively. However, oftentimes the introduction of CRE selection in a HetNet creates interference issues; for example, the CRE selection forces the UE (and/or the network) to select a weaker small cell rather than a stronger macrocell, causing the macrocell to be an interference source. To overcome this problem, the macrocell can configure some of its downlink (DL) sub-frames as Almost Blank Sub-frame (ABS), in which transmission of the control channel is completely blanked, and thus, the small cell can safely transmit signaling on its control channel. Further, the small cell can schedule, on the ABS, UEs that are located at the cell edge (e.g., because those UEs experience a higher interference when being scheduled at non-ABS). However, such ABS configuration can degrade the macrocell's capacity since the macrocell can lose a couple of sub-frames for data transmissions.

The systems and methods disclosed herein facilitate efficient scheduling and resource allocation techniques to improve quality of service provided to the UE. Small cells (e.g., femto cells, pico cells, micro cells) are deployed in a communication network to significantly increase user throughput. Oftentimes, the UE is allowed to connect with multiple access points (e.g., a macro access point and a small cell access point) and make duplicate transmissions simultaneously (or substantially simultaneously). However, the dual connectivity (DC) feature can conflict with HetNet designs, especially when CRE selection is adopted in HetNets for mobility management and/or handover decisions. The systems and methods disclosed herein enable the UE to provide additional scheduling information to an access point, which in turn utilizes the information to determine scheduling parameters and/or determine resource allocation and operation for the UE.

The following description and the annexed drawings set forth certain illustrative aspects of the specification. These aspects are indicative, however, of but a few of the various ways in which the principles of the specification may be employed. Other aspects and embodiments of the specification will become apparent from the following detailed description of the specification when considered in conjunction with the drawings.

Aspects of the various embodiments can be exploited in substantially any wireless communication technology; e.g., Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), or High Speed Packet Access (HSPA), Zigbee or another IEEE 802.XX technology. Additionally, substantially all aspects of the subject embodiments can be exploited in legacy telecommunication technologies.

Referring initially to FIG. 1, there illustrated is an example system 100 that facilitates efficient scheduling in a HetNet, according to an aspect of the subject embodiments. A HetNet comprises multiple communication cells with overlapping geographical coverage (e.g., partial or complete overlap) that operate on the same set of frequencies with different downlink transmission power. As an example, the HetNet can comprise a macrocell served by a macro access point and one or more overlapping small cells. In one aspect, a UE 104 that is coupled to a serving access point 102 (e.g., macro access point and/or small cell access point) can provide the serving access point 102 with scheduling data 106 to facilitate scheduling and/or resource allocation for the UE 104 (e.g., facilitate handover during an active mode of operation). In an example, the UE 104 can include most any electronic communication device such as, but not limited to, most any consumer electronic devices, for example, a digital media player, a digital photo frame, a digital camera, a cellular phone, a personal computer, a tablet computer, a personal digital assistant (PDA), a smart phone, a laptop, a gaming system, etc. In another example, the serving access point 102 can include, but is not limited to, an evolved NodeB (eNB), a base station, a pico station, a HomeNodeB, a Home-eNB, etc.

According to an embodiment, the UE 104 can determine scheduling data that is to be transmitted to the serving access point 102, for example, periodically, on demand, in response to detection of an event etc. As an example, the scheduling data 106 can represent a speed at which the UE 104 is traveling, motion data associated with the UE 104, direction of travel of the UE 104, etc. Additionally or alternatively, the scheduling data 106 can represent power management preferences/constraints associated with the UE 104. As an example, the power management preferences can specify information, such as, but not limited to, current battery power level, power consumption requirements of active applications, display screen power consumption, etc.

The serving access point 102 comprises a scheduling component 108 that analyzes the received scheduling data 106. Based on the analysis, the scheduling component 108 can determine whether the UE 104 is to utilize DC to connect with both a macrocell and a small cell or utilize single connectivity to connect with either one of the small cell or the macrocell. Further, the scheduling component 108 can determine, based on the analysis, whether a data transmission between the selected access point and the UE 104 is to be scheduled at an ABS or a non-ABS. For example, if the scheduling component 108 determines that the UE 104 is traveling at a high speed (e.g., above a specified speed threshold), and the UE preferences state that the UE 104 prefers low power consumption (e.g., below a specified power threshold), single connectivity can be utilized to couple the UE 104 with the macro access point and the data transmission can be scheduled at a non-ABS. Alternatively, if the scheduling component 108 determines that the UE 104 is traveling at a high speed (e.g., above the specified speed threshold), but the UE preferences state that the UE 104 does not prefer low power consumption (e.g., above the specified power threshold), single connectivity can be utilized to couple the UE 104 with either the macro access point or the small cell access point (e.g., based on CRE camping) and data transmission can be scheduled at a non-ABS. Further, if the scheduling component 108 determines that the UE 104 is traveling at a low speed (e.g., below a specified speed threshold) and/or is stationary, and the UE preferences state that the UE 104 prefers low power consumption (e.g., below a specified power threshold), single connectivity can be utilized to couple the UE 104 with either the macro access point or the small cell access point (e.g., based on CRE camping) and the data transmission can be scheduled at an ABS. Alternatively, if the scheduling component 108 determines that the UE 104 is traveling at a low speed (e.g., below a specified speed threshold) and/or is stationary, but the UE preferences state that the UE 104 does not prefer low power consumption (e.g., above a specified power threshold), dual connectivity can be utilized to couple the UE 104 with either the macro access point or the small cell access point (e.g., based on CRE camping) and the data transmission can be scheduled at a non-ABS. Although depicted as part of the serving access point 102, it can be noted that at least a portion the scheduling component 108 can be part of (or reside within) a network device (e.g. network controller device) that is coupled to serving access point 102.

Figure 2:
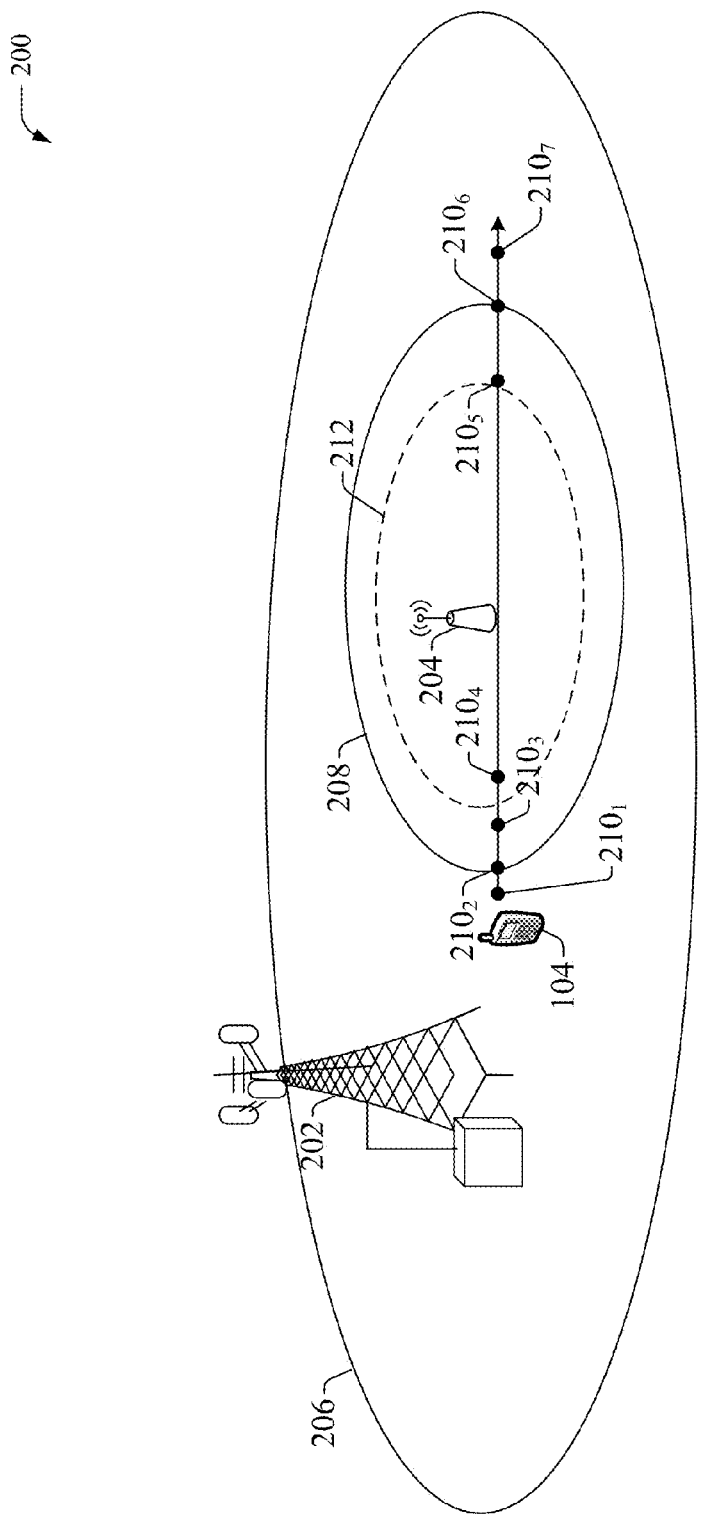
FIG. 2 illustrates an example system that facilitates scheduling based on motion of a user equipment (UE).

Referring now to FIG. 2, there illustrated is an example system 200 that facilitates scheduling based on motion of a UE in accordance with an aspect of the subject disclosure. It can be noted that the UE 104 can include functionality, as more fully described herein, for example, with regard to system 100. Further, the macro access point 202 and the small cell access point 204 can be substantially similar to the serving access point 102 and can include functionality, as more fully described herein, for example, with respect to the serving access point 102. The system 200 can include a wireless environment that comprises a macrocell 206 associated with the macro access point 202. It is noted that although the macrocell 206 is illustrated as an ellipse; the macrocells (and/or small cells) disclosed herein can adopt other geometries generally dictated by the deployment or floor plan, geographic areas to be covered (e.g., a metropolitan statistical area (MSA) or rural statistical area (RSA)), and so on. Macro coverage is generally intended to serve mobile wireless devices, including UE 104. An over-the-air wireless link provides such coverage, the wireless link can comprise a downlink (DL) and an uplink (UL), and can utilize a predetermined band, licensed or unlicensed, of the radio frequency (RF) spectrum. It is noted that a set of macro access points, its associated electronics, circuitry or components, access point control component(s), and wireless links operated in accordance with respective base stations in the set of base stations form a radio access network (RAN).

To improve indoor wireless coverage, and/or to offload the RAN, a set of small cells (e.g., picocell, femtocell, microcell), such as small cell 208 served by the small cell access point 204 can be deployed within (completely or partially) the macrocell 206. It can be noted that services provided by the small cell 208 can be extended beyond indoor coverage enhancement; for example, the small cell 208 can be utilized in areas wherein macro coverage is not poor or weak. Typically, the small cell 208 can cover an area that can be determined, at least in part, by transmission power allocated to the respective small cell access point 204, path loss, shadowing, and so forth. As an example, the coverage area of the small cell access point 204 can at least partially overlap with the macro coverage area 206 of the macro access point 202. In one aspect, the small cell access point 204 can typically serve a few (for example, 1-5) authorized wireless devices (e.g., UE 104) via a wireless link which encompasses a downlink (DL) and an uplink (UL). Further, the macro access point 202 and the small cell access point 204 operate on a common set of frequencies, within different DL transmission power. Although only one small cell 208 is illustrated in FIG. 2, it can be noted that the subject disclosure is not so limited and that one or more small cells can be deployed within (partially or completely) within the coverage area of the macrocell 206.

Typically, the UE 104 can connect to the small cell 208 when the UE 104 is within the coverage area of the small cell 208 and when received power is larger than that of the macro access point 202, e.g., $P_{small} > P_{macro}$. However, since the macro access point 202 generally transmits with higher power than the small cell access point 204, there are less UE coupling to the small cell 208 (e.g., to the core coverage area 212). Therefore, in order to offset the loading of the macrocell 206, a Cell Range Extension (CRE) bias $P_{offset}$ is added so that the UE 104 connects to the small cell 208 when $P_{small} > P_{macro} - P_{offset}$.

To overcome interference experienced by the UE 104 due to the macrocell 206, when the UE is camped on the small cell 208 at the cell edge (e.g., at 210₂, 210₃, 210₅, 210₆), the macro access point 202 can configure some of its DL sub-frames as Almost Blank Sub-frame (ABS), in which transmission of the control channel is completely blanked; as a result, the UE 104 can successfully decode the signaling from the small cell access point 204 on its control channel. Further, dual connectivity (DC) can also be enabled wherein the UE 104 can communicate simultaneously (or substantially simultaneously) with the macro access point 202 and the small cell access point 204 and the respective transmissions can be decoupled. The decoupling can include downlink and uplink transmission splitting and/or Control-plane and User-plane splitting. In one aspect, the operation of ABS and DC is conflicted, wherein ABS only allows small cell's transmission but dual connectivity requires both (macrocell and small cell's) transmissions. In addition, UE scheduling and resource allocation for ABS and DC can have different considerations and impacts on the system performance and UE QoS provisioning. Therefore, a network device (including, but not limited to, the small cell access point 204 and/or macro access point 202) can analyze data received from the UE 104 (e.g., UE speed data and/or UE power data, such as UE power preference data or power constraint data) to determine whether CRE selection or DC is to be enabled (e.g., in a manner such that UE power consumption and/or signaling overhead is reduced).

According to an aspect, when connecting with a serving cell (e.g., macrocell 206), the UE 104 can initiate CRE selection in a HetNet, for example, the UE 104 can trigger a measurement reporting whereby the serving cell (and/or the UE 104) will consider CRE for a handover request. As part of the initiation, the UE 104 can add an offset to the received signal strength of the low power node (e.g., small cell access point 204) and compare it with the signal strength of macro access point 202. As an example, the measurement reporting can be initiated when the signal strength of the low power node (e.g., small cell access point 204) with the added offset is larger than signal strength of macro access point 202. Consequently, after receiving the measurement report, the macro access point 202 can determine that the lower power node (e.g., small cell access point 204) can be considered as target cell to serve the UE 104 and can later facilitate a handover of the UE 104 to small cell access point 204.

In one aspect, the UE 104 can report channel quality information (e.g. received signaling strength or channel quality information (CQI), etc.) to its serving access point (e.g., macro access point 202 and/or the small cell access point 204). In addition, UE 104 can report, to the serving access point, scheduling information that is utilized to determine whether DC or ABS scheduling is to be implemented and/or to optimize resource allocation. The scheduling information can include, but is not limited to, UE speed information and/or UE power consumption preference information. According to an aspect, when the UE 104 is moving at a high speed (e.g., above a defined speed threshold), it is inefficient to adaptively serve UE 104 by DC/non-DC in corresponding ABS/non-ABS resources. This is because the core network may frequently change the scheduling due to the UE's fast movement. For example, when UE 104 moves in an example trajectory (from 210₁-210₇) depicted in FIG. 2, the connection and scheduling associated with the UE 104 can be determined by the serving access point (e.g., macro access point 202 and/or the small cell access point 204) as follows: (i) At 210₁, the serving cell can implement a single connectivity of the UE 104 with the macro access point 202, scheduled at a non-ABS; (ii) At 210₂, the serving cell can implement dual connectivity with the macro access point 202 and the small cell access point 204, scheduled at a non-ABS; (iii) At 210₃, the serving cell can implement single connectivity with the small cell access point 204, scheduled at an ABS; (iv) At 210₄, the serving cell can implement dual connectivity with the small cell access point 204 and the macro access point 202, scheduled at a non-ABS; (v) At 210₅, the serving cell can implement single connectivity with the small cell access point 204, scheduled at an ABS; (vi) At 210₆, the serving cell can implement dual connectivity with the macro access point 202 and the small cell access point 204, scheduled at a non-ABS; and (vii) At 210₇, the serving cell can implement single connectivity with the macro access point 202, scheduled at a non-ABS. Thus, there can be at least six scheduling transitions when the UE 104 moves along the example trajectory. In this example scenario, if the UE 104 moves quickly, the scheduling complexity will increase and acquire very limited gains by the short adaption. Thus, for UEs moving at a high speed (e.g., above a defined speed threshold), the serving cell (and/or network device) can instruct the UE 104 (and/or coordinate with neighboring cells) to be coupled only to the macro access point 202 and use a single connectivity to provide more reliable transmission. In addition, the network can save many overheads without the frequent handovers.

Figure 3:
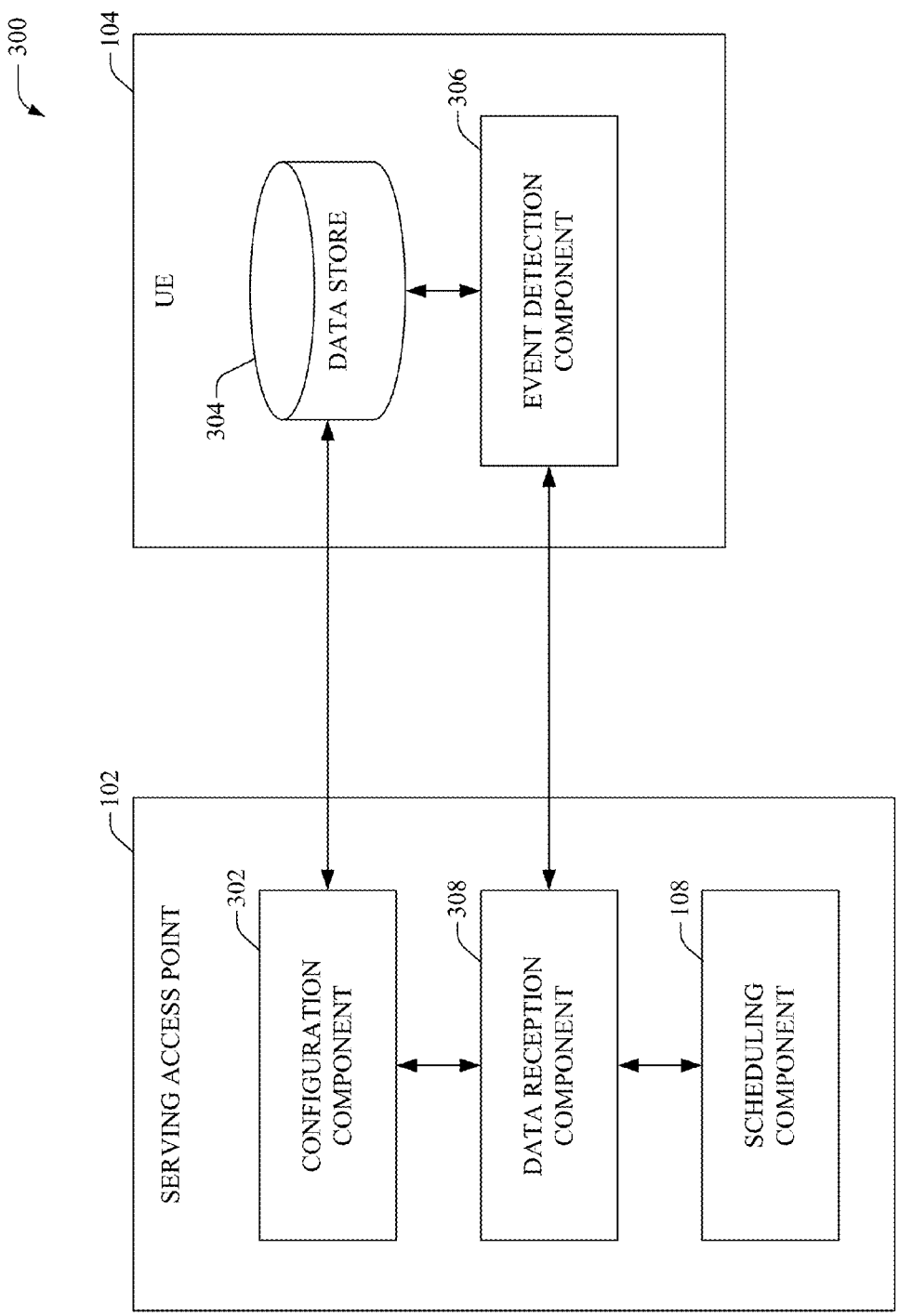
FIG. 3 illustrates an example system that facilitates configuration of events that trigger reporting of scheduling data to a serving access point.

FIG. 3 illustrates an example system 300 that facilitates configuration of events that trigger reporting of scheduling data to a serving access point, according to an aspect of the subject disclosure. In one aspect, the serving access point 102 can analyze the scheduling data to determine whether to implement DC and/or determine the scheduling of data transmission from the serving access point 102 to the UE 104 (e.g., via ABS or non-ABS). It is noted that the serving access point 102 can include a macro access point and/or a small cell access point to which the UE 104 is currently coupled. The serving access point 102, the UE 104, and the scheduling component 108 can include functionality, as more fully described herein, for example, with regard to systems 100-200.

In one aspect, the serving access point 102 can comprise a configuration component 302 that determines configuration parameters associated with transmission of scheduling data (e.g., UE speed data) from the UE 104 to the serving access point 102. In one aspect, the configuration parameters can be defined based on operator preferences, network data (e.g., number of neighboring access points in the HetNet), historical data, etc. Moreover, the configuration parameters can specify when the UE 104 is to report the speed data. For example, the configuration parameters can specify a speed criterion (e.g., a threshold and/or a range), which when the UE 104 determines to be satisfied, is to report "1" and when the UE 104 determines to not be satisfied, is to report "0". As an example, the configuration parameters can include a threshold value, such as, but not limited to, a physical speed (e.g., 60 km/hr), a number of cell changes within a specified period of time (e.g., 10 cell changes within 1 hr), and/or the time of stay in previous camping cell (e.g., 30 min in previous cell). It is noted that the above-mentioned thresholds are only a few examples and that most any thresholds and/or ranges can be specified via the configuration parameters.

The configuration component 302 can transmit the configuration parameters to the UE 104, for example, when the UE 104 couples to/registers with the serving access point 102, periodically, at a specified time, on-demand, etc. For example, configuration component 302 can transmit the configuration parameters via a broadcast message (e.g., system information broadcast message) and/or via unicast radio resource control (RRC) signaling. In one aspect, if unicast signaling is utilized, the configuration parameters can be customized for the UE 104 (e.g., based on UE preferences, UE behavior, operator preferences, etc.). The UE 104 can store the configuration parameters in its data store 304. It can be noted that the data store 304 can include volatile memory(s) or nonvolatile memory(s), or can include both volatile and nonvolatile memory(s). Examples of suitable types of volatile and non-volatile memory are described below with reference to FIG. 14. The memory (e.g., data stores, databases) of the subject systems and methods is intended to include, without being limited to, these and any other suitable types of memory.

According to an embodiment, an event detection component 306 can monitor the UE 104 to determine whether the speed criterion has been satisfied. For example, the event detection component 306 can determine whether the UE 104 is moving at a speed greater than the speed threshold defined in the configuration parameters, whether the number of cells that UE 104 has changed within the specified period of time is greater than a cell threshold defined in the configuration parameters, and/or the whether the time that the UE 104 has remained in previous camping cell is greater than a time threshold defined in the configuration parameters, etc. On detection of one or more of the threshold being exceeded, the event detection component 306 can transmit to the serving access point 102 scheduling data (in a manner specified by the configuration parameters) to facilitate network scheduling and/or resource allocation. For example, the event detection component 306 can transmit the scheduling data via a specified set of bits and/or flags (e.g., transmitting "0" when determined that the threshold(s) are not exceeded or "1" when determined that the threshold(s) have been exceeded). A data reception component 308 can receive the scheduling data from the event detection component 306 and provide the scheduling data to the scheduling component 108, which analyzes the scheduling data to determine whether to enable DC and/or whether to schedule transmissions with the UE 104 on ABS or non-ABS. Further, the scheduling component 108 can configure and/or coordinate with neighboring cells in the HetNet to facilitate resource allocation based on the scheduling data. Although depicted as part of the serving access point 102, it can be noted that at least a part of one or more of the configuration component 302, the data reception component 308, and the scheduling component 108 can be included within a network device (not shown) that is coupled to serving access point 102.

Figure 4:
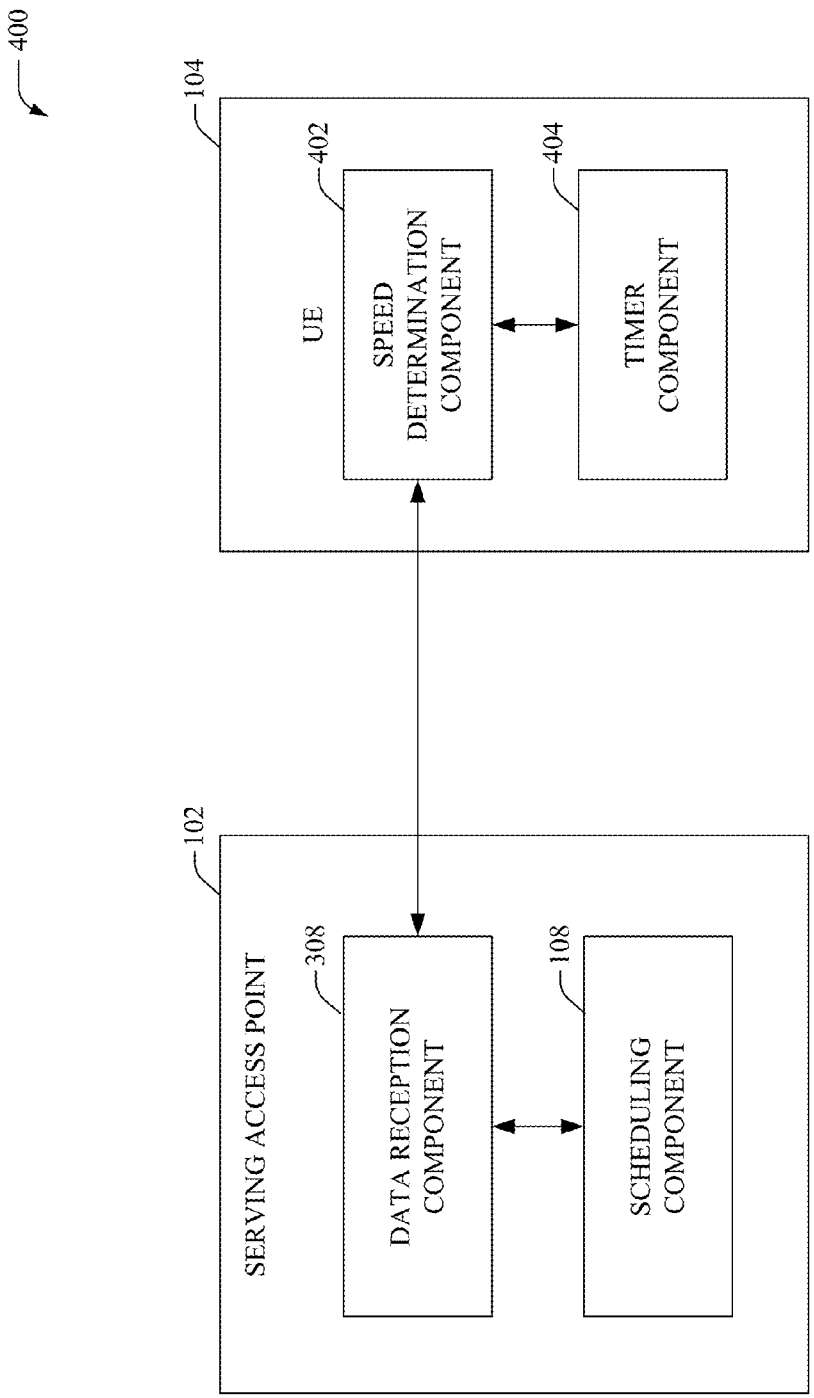
FIG. 4 illustrates an example system that facilitates automatic transmission of scheduling data from a UE to a serving cell.

FIG. 4 illustrates example system 400 that facilitates automatic transmission of scheduling data from a UE to a serving cell, according to an aspect of the subject embodiments. It is noted that the serving access point 102, the UE 104, the scheduling component 108, and the data reception component 308 can include functionality, as more fully described herein, for example, with regard to systems 100-300. In one aspect, system 400 increases the reporting flexibility and provides information that is more accurate; as a result, the serving cell can appropriately adjust the scheduling or transmission to the UE 104.

In one aspect, the UE 104 can include a speed determination component 402 that identifies speed information associated with the UE 104. As an example, the speed information can comprise physical speed (e.g., based on global positioning system (GPS) data, sensor data, etc.), a cell change count, and/or a time of stay in previous cell. According to an embodiment, the speed determination component 402 can transmit the speed information to the serving cell, for example, by appending/including the speed information to an existing message or via a new message. In one example, the speed determination component 402 can transmit the speed information during radio resource control (RRC) (re-)establishment (e.g., via an RRCConnectionSetupComplete message). It can be noted that the speed information related to the cell change count and time of stay in the previous cell does not change before a new RRC re-establishment and thus, by transmitting the speed information in an RRC message, the UE 104 can update the speed information only when a new cell is selected for connection. Additionally or alternatively, the speed determination component 402 can also utilize Medium Access Control (MAC) Control Element (CE) to update the speed information if needed (e.g., when it has been determined that the physical speed of the UE 104 has changed). In one aspect, the speed determination component 402 can implement quantification, normalization, and/or classification of the physical speed of the UE 104 to reduce the reporting bits required for transmission of the speed information. For example, the speed determination component 402 can classify the current speed of the UE 104 as high, medium, or low speed based on comparison of the speed with a set of speed thresholds. Alternatively, a reporting format can be specified, for example, during provisioning, activation, and/or an over-the-air update.

As speed information is transmitted more frequently (as compared to that in system 300), reporting flexibility is increased such that the serving cell has the latest and most accurate speed information. As a result, the scheduling component 108 can more efficiently and accurately adjust the scheduling and/or resource allocation. However, the frequent speed information transmission may increase signaling overhead. To prevent excessive reporting, a timer component 404 can be utilized that prohibits transmission of speed data from the UE 104 to the serving access point 102 when a cell timer is running (e.g., not expired). As an example, the cell timer can be implemented by the serving access point 102 and/or the UE 104. Moreover, the cell timer is started each when the speed determination component 402 transmits the speed information (and/or when the data reception component 308 receives the speed information from the UE 104). The time period of the timer can be pre-configured (e.g., by a service provider) and/or dynamically determined to optimize speed information transmissions (e.g., based on a cost-benefit analysis that determines whether the cost of increased signaling overheads outweighs the benefit of providing the serving cell with accurate/up-to-date speed information and/or the benefit of efficient scheduling/resource allocation). For example, the cell timer can be configured to a value of 10 seconds, and the cell timer can start/re-start when the speed determination component 402 transmits the speed information (and/or when the data reception component 308 receives the speed information). Once the cell timer has started, the timer component 404 ensures that the speed determination component 402 does not report the speed information while the timer is running and authorizes transmissions from the speed determination component 402 only after the cell timer has expired. Although depicted as residing within the UE 104, it can be noted that the timer component 404 can reside in the serving access point 102 and/or anywhere in the radio access network.

Figure 5:
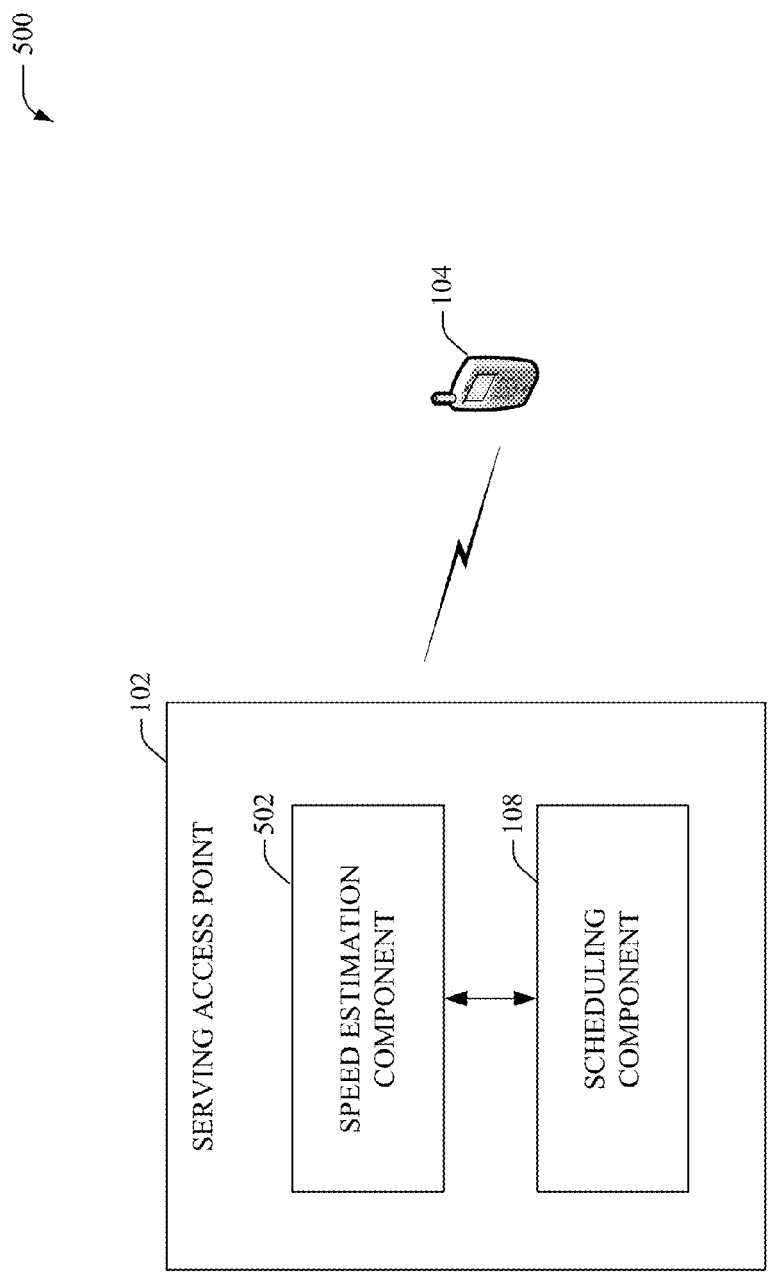
FIG. 5 illustrates an example system that reduces signaling during determination of a UE's speed.

Referring now to FIG. 5 there illustrated is an example system 500 that facilitates a decrease in signaling during determination of a UE's speed in accordance with an aspect of the subject disclosure. It is noted that the serving access point 102, the UE 104 and the scheduling component 108 can include functionality, as more fully described herein, for example, with regard to systems 100-400. As an example, the serving access point 102 of system 500 can determine whether to enable DC and/or determine the scheduling of data transmission from the serving access point 102 to the UE 104 (e.g., on ABS or non-ABS) based on estimating speed/motion/direction of travel of the UE 104.

According to an embodiment, a speed estimation component 502 can be utilized to determine the speed of the UE 104 and/or determine whether the UE 104 satisfies a predefined speed criterion. In one aspect, the speed estimation component 502 can monitor channel quality indicator (CQI) data associated with the UE 104. Moreover, the speed estimation component 502 can determine whether the UE 104 is moving slowly (or is stationary) or quickly based on observing a change in the CQI data. For example, if CQI varies a lot (e.g., greater than a predefined threshold) within a short period time, the speed estimation component 502 can determine that the UE 104 is moving at a high speed. In contrast, if the CQI does not vary often or is constant within the short time period, the speed estimation component 502 can determine that the UE 104 is moving slowly or is stationary.

In another embodiment, the speed estimation component 502 can obtain handover (HO) information related to the UE 104, for example, from upper layer elements of the core network. The handover information can be indicative of an HO count (e.g., the number of HOs performed by the UE 104 within a specified time period). As an example, if the HO count is high (e.g., greater than a predefined threshold), the speed estimation component 502 can determine that the UE 104 is moving at a high speed and if the HO count is low (e.g., less than or equal to the predefined threshold), the speed estimation component 502 can determine that the UE 104 is moving slowly (or is stationary). It is noted that the subject system is not limited to the above noted examples for speed estimation and that most any data can be utilized to determine UE speed. For example, location data associated (e.g., received from a GPS system and/or core network server) can also be utilize to estimate UE speed.

The estimated speed data is then provided to the scheduling component 108 (e.g., periodically, on-demand, in response to an event, etc.), which in turn utilizes the estimated speed data to determine whether DC is to be enabled and/or whether the data transmissions from the serving access point 102 to the UE 104 are to be scheduled on an ABS or a non-ABS. System 500 reduces signaling between the serving access point 102 and the UE 104 that is otherwise utilized to transfer UE speed information (as shown with respect to systems 300 and 400); however, cell complexity can increase and the accuracy speed of the information can be low. Although depicted as part of the serving access point 102, it can be noted that at least a portion of the speed estimation component 502 can be part of (or reside within) a network device (not shown) that is coupled to serving access point 102.

Figure 6:
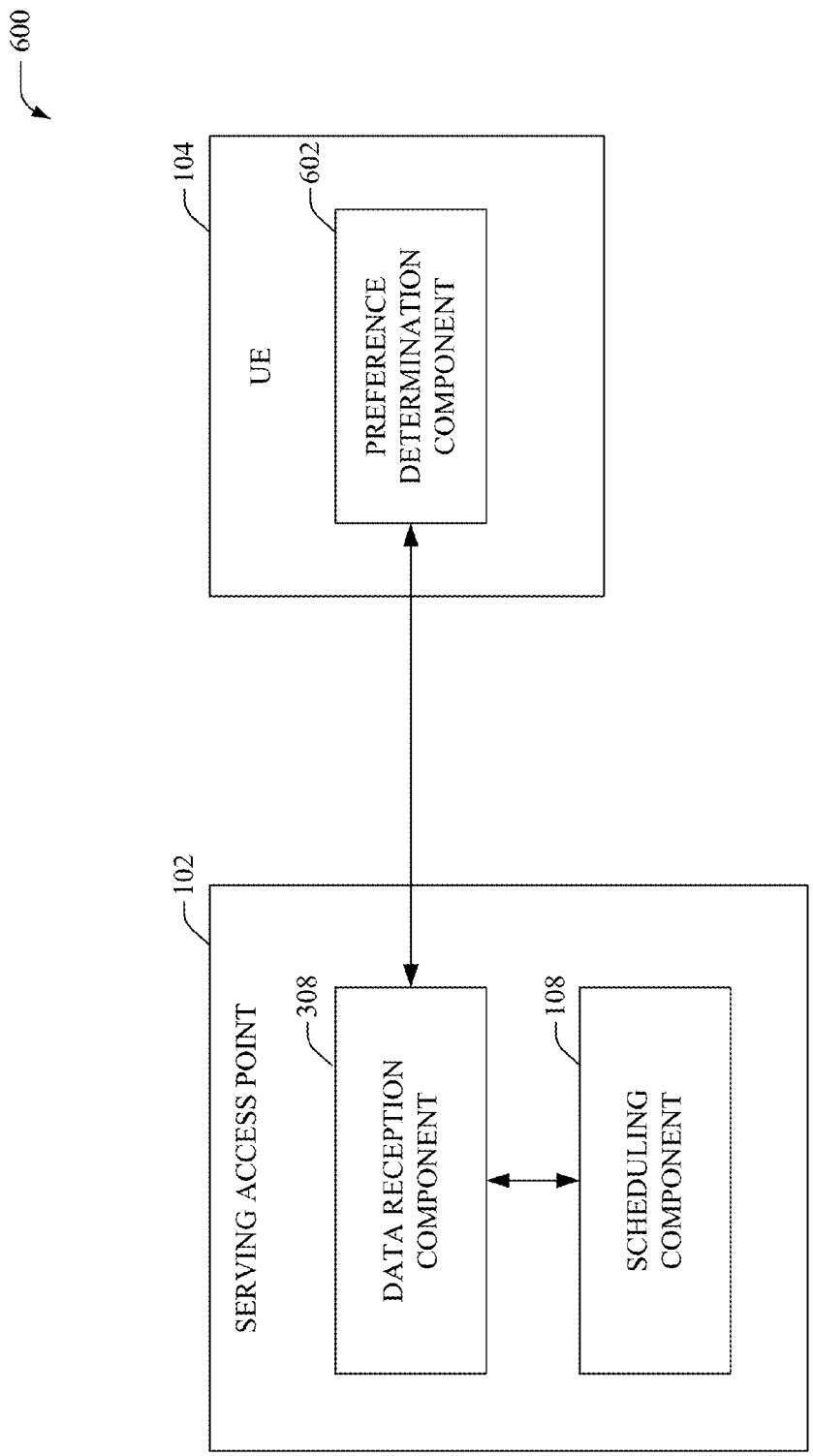
FIG. 6 illustrates an example system that facilitates enabling dual connectivity (DC) based on power consumption preferences of a UE.

FIG. 6 illustrates an example system 600 that facilitates enabling DC based on power consumption preferences of the UE 104 in accordance with an aspect of the subject disclosure. It is noted that the serving access point 102, the UE 104, the scheduling component 108, and the data reception component 308 can include functionality, as more fully described herein, for example, with regard to systems 100-500. In one aspect, scheduling component 108 can determine whether DC is to be implemented for the UE 104. When DC is implemented, the UE 104 maintains two simultaneous (or substantially simultaneous) connections, for example, one with a macro access point and the other with a small cell access point. Moreover, the UE 104 operates two transceivers to support DL/UL data transmission and monitor control signaling from both access points. When CRE selection is applied, the UE 104 can select a weak small cell (instead of a macrocell transmitting with higher power) for communication and accordingly, the UE 104 would have to increase its transmission power to communicate with the weaker small cell (due to its long distance). With an increase in transmission power and/or the increase in the number of transceivers operating, the battery life of the UE 104 can be quickly drained. System 600 facilitates utilization of power consumption preference data associated with the UE 104 to conserve battery power.

According to an aspect, the preference determination component 602 can determine the UE's power consumption preference, for example, based on user preferences, service provider policies, device preferences, UE manufacturer preferences, etc. The preference determination component 602 can monitor the current power level of the battery and/or power consumption requirements of active applications to determine the UE's power consumption preference. In one aspect, a bit can be utilized to represent the UE's power consumption preference. For example, the preference determination component 602 can set the bit as "1" to indicate that the UE 104 has sufficient battery power to support large power consumption during its operation, and that the serving cell can serve it by DC or CRE selection (e.g., request it to select a weaker cell for the loading offload). Otherwise, the preference determination component 602 can set the bit as "0" to indicate that the UE 104 prefers to be served in an energy-efficient manner to extend its battery life. Additionally, the preference determination component 602 can also assign the bit as "1" when various power criteria are determined to be satisfied. For example, the preference determination component 602 can determine that the bit '1' can be transmitted to the serving access point 102 if the UE 104 is connected to a power line (e.g., is charging, plugged into a power source, etc.), the battery level of UE 104 is higher than a defined threshold (and/or within a specific range), a Wi-Fi module (not shown) of the UE 104 is turned off (e.g., when the Wi-Fi module is turned on, the transmission may rely on Wi-Fi and applying to DC or CRE to support spectrum efficiency improvement is not required), one or more applications of the UE 104 are requesting a high data rate, a display screen of the UE 104 is turned on (e.g., the user is paying attention on whether a better performance is achieved), and so on. On another aspect, the preference determination component 602 can utilize multiple indications, such as multiple bits, to indicate power consumption preference. For example, duplicate indications of "1" indicate that the UE 104 has a stronger power consumption preference to aggressively support DC and/or CRE selection to achieve high data rate.

The preference determination component 602 can transmit the one or more bits to the serving access point 102 periodically, on demand, in response to detecting an event, etc. As an example, the one or more bits can be transmitted via a MAC CE and/or RRC signaling. In one aspect, the serving access point 102 can set a timer to limit the update of indications (e.g., by employing the timer component 404). The data reception component 308 can receive the preference bit(s) and record the received bit(s), for example, in a local data store (not shown) and map to a corresponding level or priority/urgency. Moreover, it is unknown how much power consumption could be saved after reporting; thus, if the power consumption criteria are not satisfied based on the adaption from the serving cell, the preference determination component 602 can retransmit bit(s). On receiving multiple bits, the data reception component 308 can increase or decrease the priority/urgency associated with the power consumption preferences of the UE 104 based on the received bits. Accordingly, quantified power levels and multiple indications are utilized to reflect how urgently the UE 104 wants to save its power consumption. The data reception component 308 can forwards the bit(s) and/or priority data to the scheduling component 108.

In one aspect, the scheduling component 108 can evaluate whether the UE's preferences will be utilized to bias the scheduling or not. In one example, the scheduling component 108 can utilize the UE's preferences to facilitate scheduling and/or resource utilization. Moreover, if the UE 104 is determined to have sufficient battery power (e.g., bit is assigned "1"), the scheduling component 108 can enable DC and/or implement CRE selection (e.g., to facilitate selection of a weaker small cell by the UE 104). Alternatively, if the UE 104 is determined to have insufficient battery power (e.g., bit is assigned "0"), the scheduling component 108 can disable DC and/or CRE selection. In another example, if a large group of UEs (including UE 104) indicates that they are high-speed users, there is a risk that the serving cell's loading will become heavy, if the scheduling component follows the UE's preferences to avoid frequent adaptive changes between DC/non-DC operations and scheduling. Considering this risk, in this example scenario, the scheduling component 108 can reject UE's preferences and/or prioritize the different reporting UEs such that preferences from UEs having low priority can be rejected and those having a high priority can be considered. Furthermore, the resource usage (e.g., amount of ABS) is semi-allocated and can be insufficient when an adapting is required after receiving the UE preference. To overcome the problem, scheduling component 108 can initiate inter-cell coordination with neighboring cell to re-arrange resource usage. In other words, the scheduling component 108 can perform statistical analysis based on the UE's preference to determine how many resources are required and coordinate resource usage with its neighboring cells.

Figure 7:
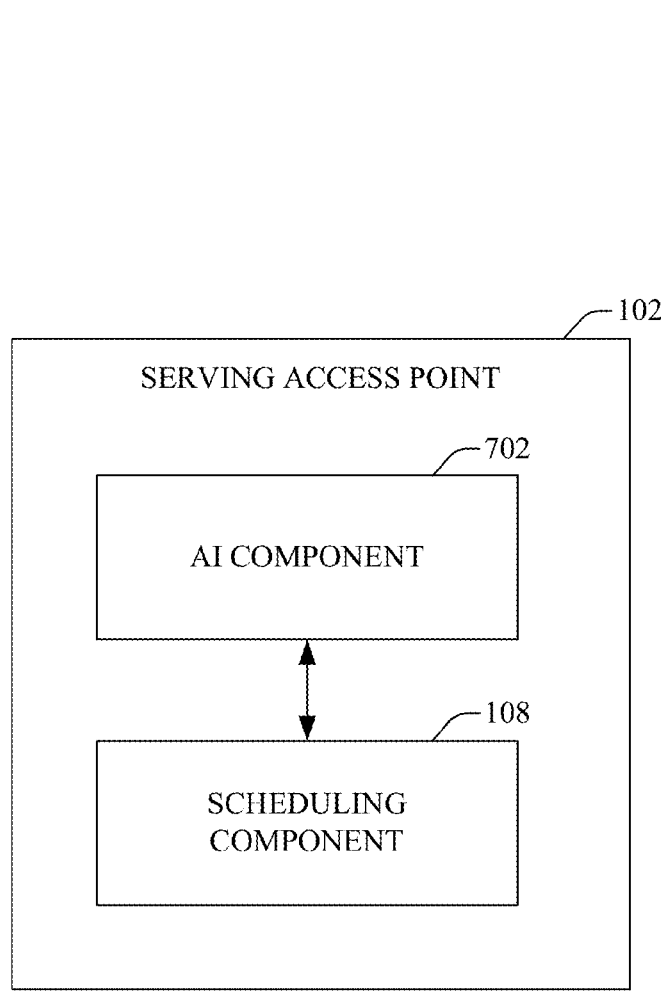
FIG. 7 illustrates an example system that facilitates automating one or more features in accordance with an embodiment.

Referring now to FIG. 7, there illustrated is an example system 700 that employs an artificial intelligence (AI) component 702, which facilitates automating one or more features in accordance with the subject embodiments. It is noted that the serving access point 102, the UE 104, and the scheduling component 108 can include functionality, as more fully described herein, for example, with regard to systems 100-600.

The subject embodiments (e.g., in connection with automatically determining when to enable DC, when to disable DC, when to schedule a transmission via an ABS, when to schedule a transmission via a non-ABS, etc.) can employ various AI-based schemes for carrying out various aspects thereof. For example, a process for determining whether DC is to be enabled, whether transmissions are to be scheduled via an ABS, etc., can be facilitated via an automatic classifier system and process. A classifier is a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed. In the case of communication systems, for example, attributes can be information stored in data store 304, and the classes can be categories or areas of interest (e.g., levels of priorities). A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject embodiments can employ classifiers that are explicitly trained (e.g., via a generic training data) as well as implicitly trained (e.g., via observing UE behavior, operator preferences, historical information, receiving extrinsic information). For example, SVM's are configured via a learning or training phase within a classifier constructor and feature selection module. Thus, the classifier(s) can be used to automatically learn and perform a number of functions, including but not limited to determining how fast the UE is predicted to move, a direction that the UE is expected to travel in, whether enabling DC is more efficient than disabling DC, whether scheduling transmissions via an ABS is more efficient than scheduling transmissions via a non-ABS, etc. The criterion can include, but is not limited to, historical patterns, UE behavior, user preferences, service provider preferences and/or policies, small cell parameters, location of the small cell, location/direction/speed/motion of the UE, etc. Although depicted as residing within the serving access point 102, it can be noted that at least a portion of the AI component 702 can be included a network device (not shown) that is coupled to serving access point 102.

Figure 8:
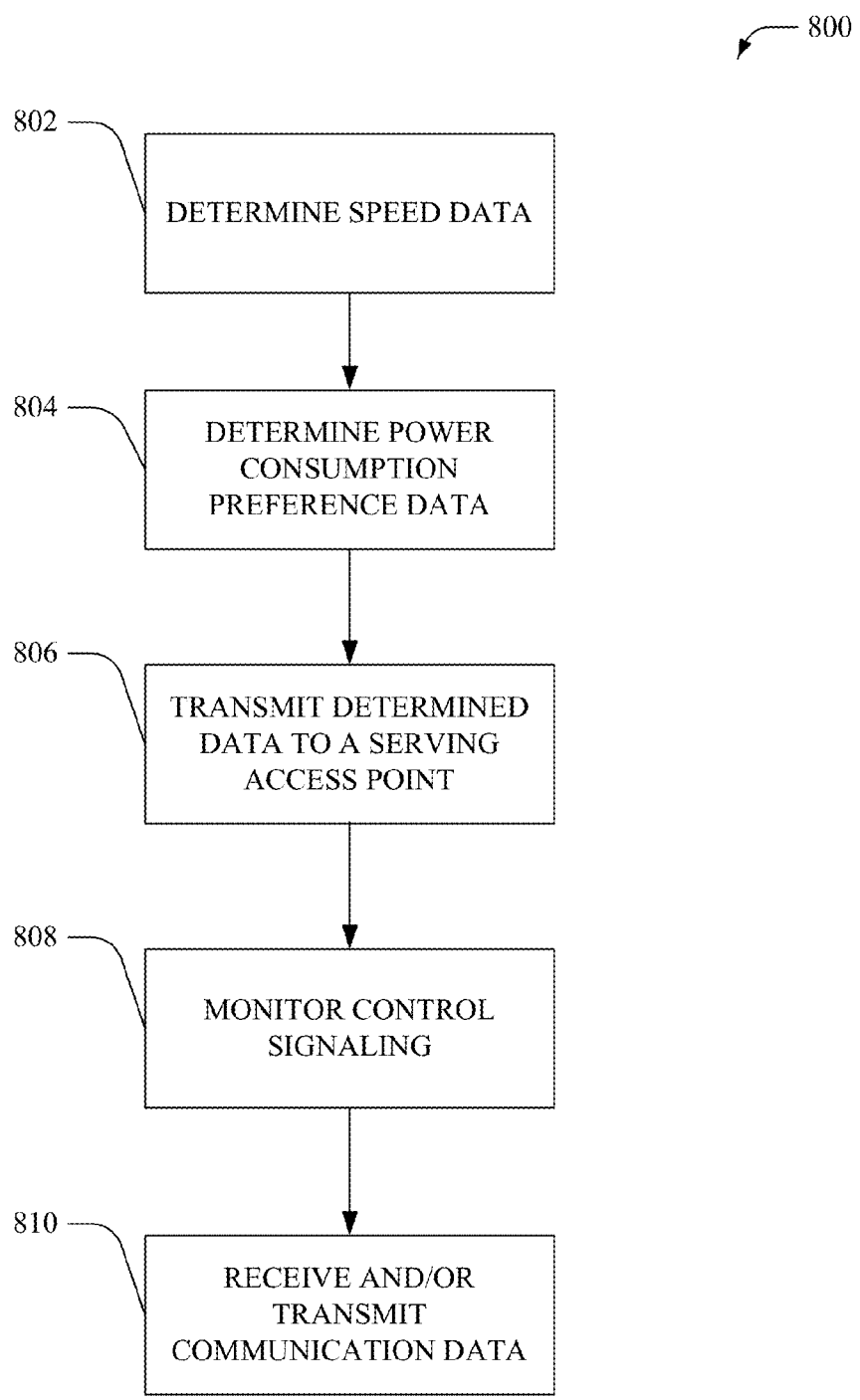
FIG. 8 illustrates an example method that reports scheduling data from a UE to a serving access point to facilitate scheduling and/or network resource utilization.
Figure 9:
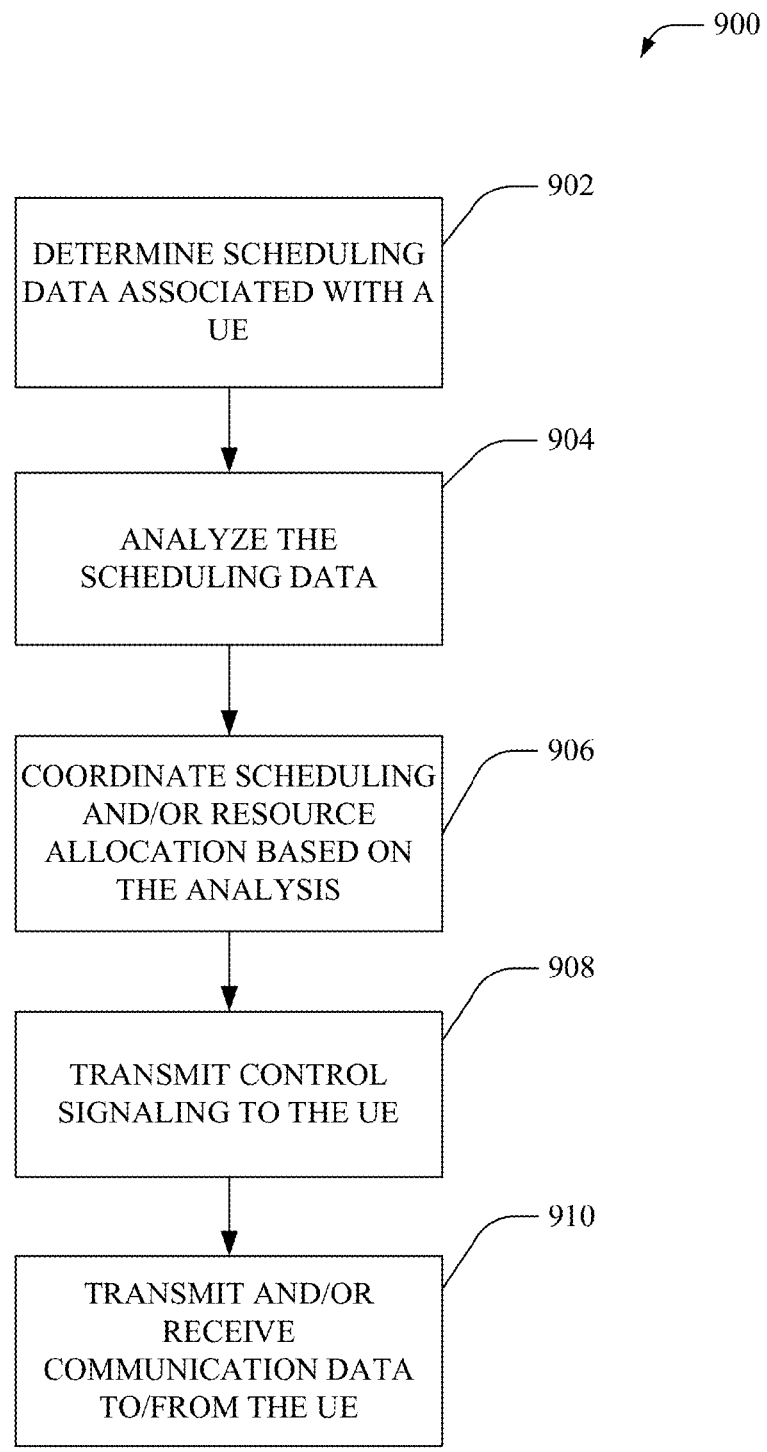
FIG. 9 illustrates an example method that facilitates scheduling and/or network resource allocation based on scheduling data associated with a UE.
Figure 10:
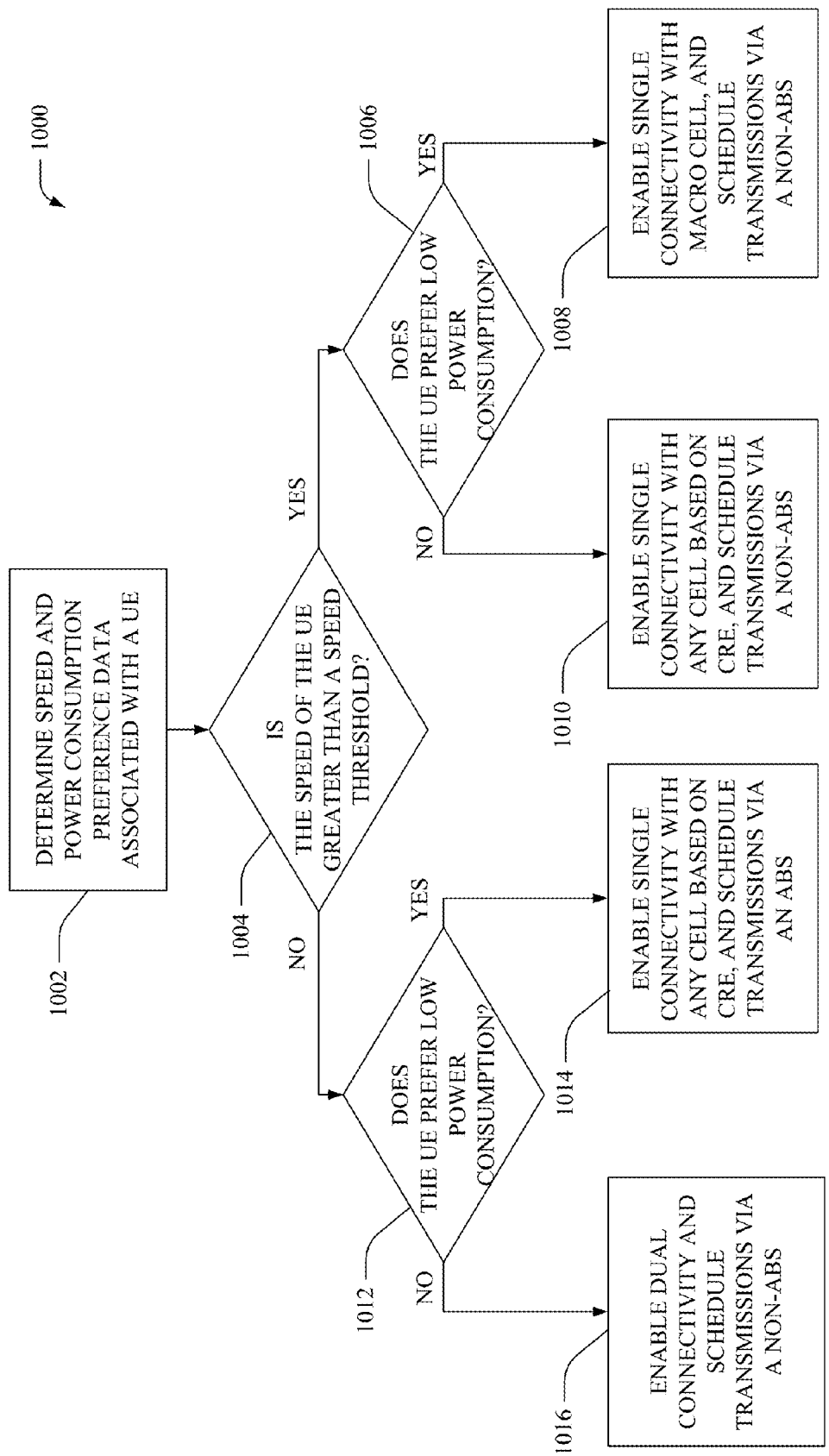
FIG. 10 illustrates an example method that facilitates cell scheduling based on UE speed and power data.

FIGS. 8-10 illustrate methodologies and/or flow diagrams in accordance with the disclosed subject matter. For simplicity of explanation, the methodologies are depicted and described as a series of acts. It is to be understood and appreciated that the subject embodiments are not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram of events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or computer-readable storage/communications media.

Referring now to FIG. 8, illustrated is an example method 800 that reports scheduling data from a UE to a serving access point to facilitate scheduling and/or network resource utilization, according to an aspect of the subject specification. In one example, the method 800 can be implemented by a UE within a HetNet (e.g., comprising at least one macrocell and a small cell). At 802, speed data can be determined. As an example, speed data can be indicative of a physical speed of the UE (e.g., determined based on GPS data, motion sensors, etc.), a cell change count, a time period for which the UE was coupled to a previous cell, etc. Further, the speed data can comprise an absolute value, a normalized value, and/or a classification associated with the UE speed. At 804, power consumption preference data can be determined. As an example, the power consumption preference data can be determined based on various criteria, such as, but not limited to, whether the UE is connected to a power line (e.g., is charging, plugged into a power source, etc.), the current battery level of the UE, an operating status of a Wi-Fi module of the UE (e.g., whether the Wi-Fi module is turned on or off), the requirements/demands of one or more applications on the UE, status of the display screen of the UE (e.g., whether the display screen is turned on or off), current power saving mode of the UE, etc. In one aspect, the one or more bits can be utilized to represent the power consumption preference data.

At 806, the speed data and/or the power consumption preference data can be transmitted to a serving access point (e.g., periodically, on demand, in response to detecting an event, etc.). In one example, the speed data and/or the power consumption preference data can be conveyed via a MAC CE and/or RRC signaling. Based on the transmitted data, the serving access point can facilitate scheduling and/or network resource utilization. At 808, control signaling can be monitored. In one aspect, based on the control signaling, the UE can determine how and/or when communication data is to be exchanged. Further, at 810, based on the control signaling, communication data can be received and/or transmitted.

FIG. 9 illustrates an example method 900 that facilitates scheduling and/or network resource allocation based on scheduling data associated with a UE in accordance with an aspect of the subject specification. As an example, serving access point (e.g., a macro access point and/or a small cell access point of a HetNet) and/or network device can perform method 900. At 902, scheduling data associated with a UE can be determined (e.g., periodically, on demand, in response to an event, etc.). The scheduling data can comprise speed data and/or the power consumption preference data associated with the UE. In one example, the scheduling data can be received from the UE. In another example, the scheduling data can be estimated based on data received from core network devices. At 904, the scheduling data can be analyzed. For example, it can be determined whether associated resources are sufficient for transmissions to the UE. At 906, based on the analysis, scheduling and/or resource allocation can be coordinated (e.g., with one or more neighboring access points in the HetNet). It can be noted that the UE is communicating with the network and is not in an idle mode. In one aspect, it can be determined, based on the analysis, whether the UE is to utilize DC to connect with multiple cells or utilize single connectivity to connect with a selected cell. Further, it can be determined, based on the analysis, whether a data transmission between the selected access point(s) and the UE is to be scheduled at an ABS or a non-ABS. At 908, control signaling can be transmitted to the UE, for example, so that the UE is aware of the scheduling and/or resource allocation decisions. Further, at 910, communication data can be transmitted to/received from the UE in accordance with the scheduling and/or resource allocation.

FIG. 10 illustrates an example method 1000 that facilitates cell scheduling based on UE speed and power data, according to an aspect of the subject disclosure. In one aspect, the UE can be coupled to a HetNet, comprising a macrocell and at least one small cell having overlapping coverage areas and operating on a common set of frequencies. At 1002, the speed and power data associated with the UE can be determined. At 1004, it can be determined whether the speed of the UE is greater than a speed threshold. If the speed of the UE is determined to be greater than the speed threshold, at 1006, it can be determined whether the UE prefers low power consumption (e.g., to conserve battery power). If it is determined that the UE prefers low power consumption, then at 1008, single connectivity with the macrocell can be enabled and a data transmission between the UE and the macrocell can be facilitated via a non-ABS. Alternatively, if it is determined that the UE does not prefer low power consumption (e.g., UE has sufficient battery power), then at 1010, single connectivity with the either the macrocell or the small cell can be enabled by employing CRE selection and a data transmission between the UE and the selected cell can be facilitated via a non-ABS.

Further, if it is determined (at 1004) that the speed of the UE is less than (or equal to) the speed threshold, at 1012, it can be determined whether the UE prefers low power consumption (e.g., to conserve battery power). If it is determined that the UE prefers low power consumption, then at 1014, single connectivity with the either the macrocell or the small cell can be enabled by employing CRE selection and data transmission between the UE and the macrocell can be facilitated via an ABS. Alternatively, if it is determined that the UE does not prefer low power consumption (e.g., UE has sufficient battery power), then at 1016, dual connectivity with the macrocell and the small cell can be enabled and a data transmission between the UE and the cells can be facilitated via either a non-ABS.

Figure 11:
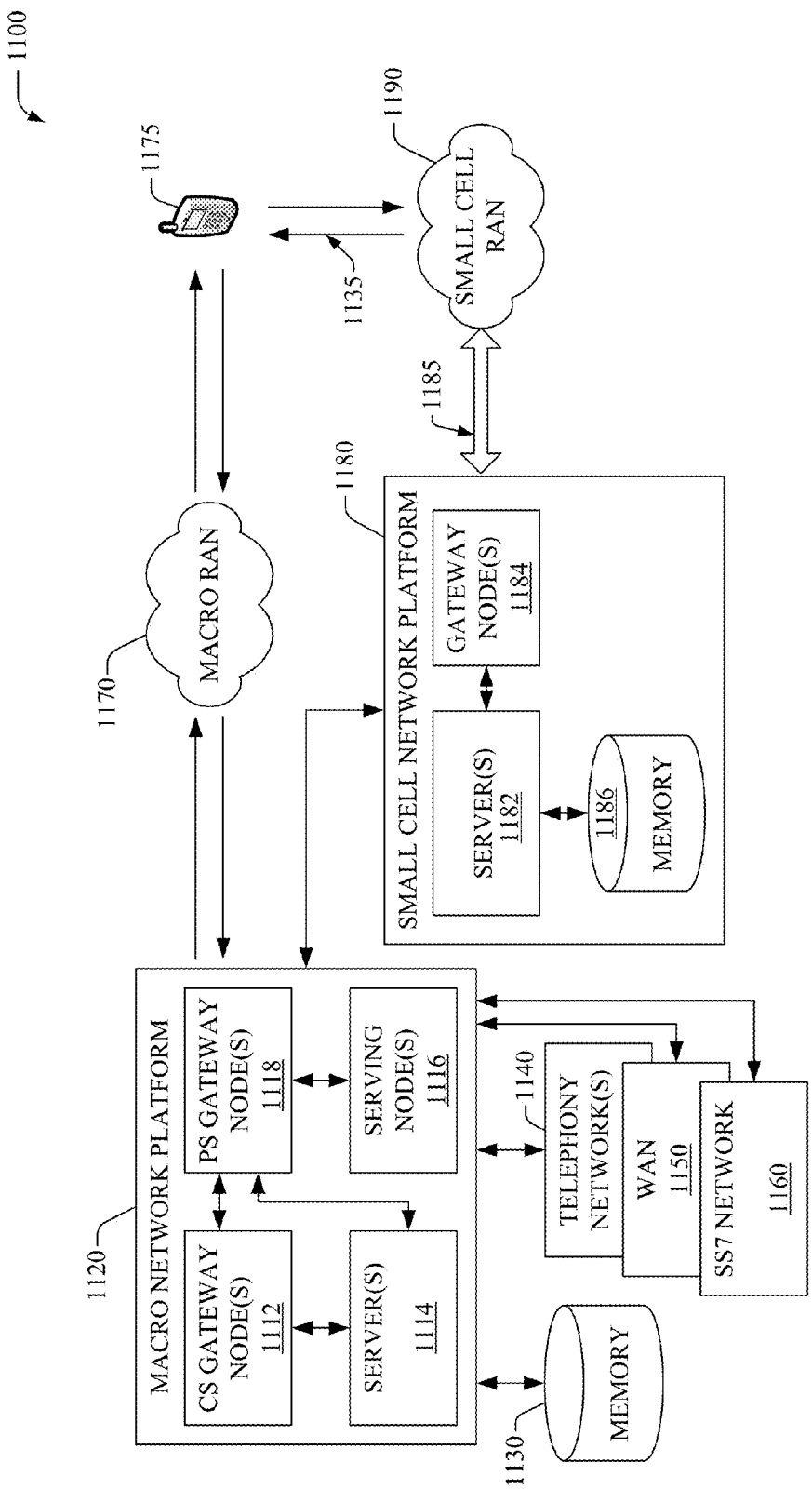
FIG. 11 illustrates a schematic deployment of a macrocell and a small cell for wireless coverage in accordance with aspects of the disclosure.
Figure 12:
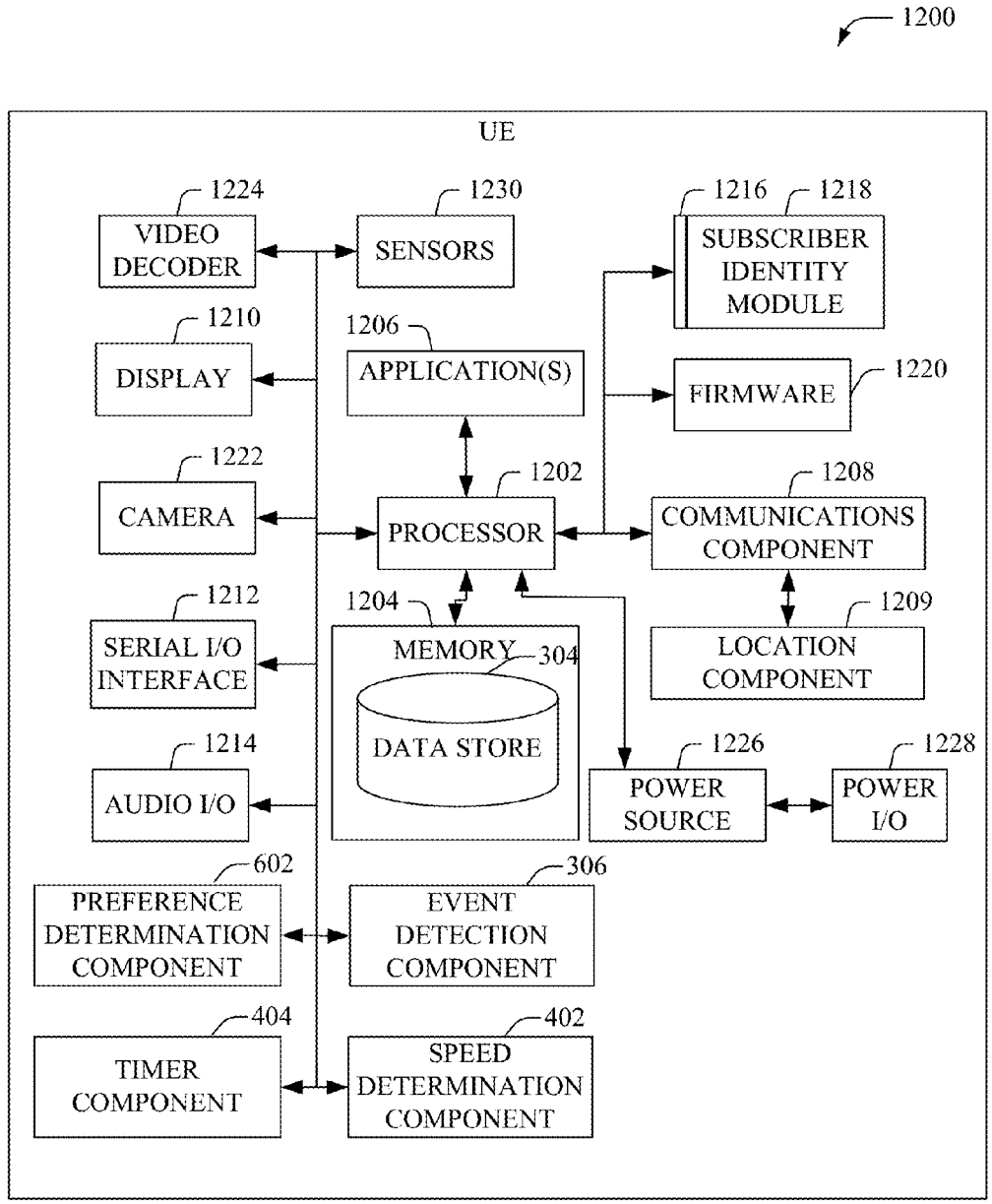
FIG. 12 illustrates an example block diagram of a UE suitable for reporting scheduling data to a serving access point.

To provide further context for various aspects of the subject specification, FIGS. 11 and 12 illustrate, respectively, an example wireless communication environment 1100 and a block diagram of an example embodiment 1200 of a UE, which can report scheduling data to facilitate dynamic scheduling and/or resource allocation in accordance with aspects described herein.

Wireless communication environment 1100 includes two wireless network platforms: (i) A macro network platform 1120 that serves, or facilitates communication) with user equipment 1175 via a set of macro cells 1170. It should be appreciated that in cellular wireless technologies (e.g., 3GPP UMTS, HSPA, 3GPP LTE, 3GPP UMB, 4G LTE, etc.), macro network platform 1120 is embodied in a Core Network. (ii) A small cell network platform 1180, which can provide communication with UE 1175 through a set of small cells 1190 linked to the small cell network platform 110 via backhaul link(s) 1185. Further, UE 1175 can be substantially similar to UE 104, and can include functionality, as more fully described herein, for example, with regard to systems 100-700. It can be noted that small cell network platform 1180 typically offloads UE 1175 from macro network, once UE 1175 attaches (e.g., through a macro-to-small cell handover that employs an augmented neighbor list) to small cell RAN.

It is noted that RAN includes eNBs, base station(s), or access point(s), and its associated electronic circuitry and deployment site(s), in addition to a wireless radio link operated in accordance with the eNB(s). Accordingly, macro cells 1170 can comprise various coverage cells like cell 206, while small cells 1190 can comprise multiple small cell access points like small cell access point 204. As mentioned above, it is to be noted that deployment density of small cells 1190 is substantially higher than that of macro cells 1170.

Generally, both macro and small cell network platforms (1120 and 1180) can include components, e.g., nodes, gateways, interfaces, servers, or platforms, that facilitate both packet-switched (PS) and circuit-switched (CS) traffic (e.g., voice and data) and control generation for networked wireless communication. For example, macro network platform 1120 includes CS gateway node(s) 1112 which can interface CS traffic received from legacy networks like telephony network(s) 1140 (e.g., public switched telephone network (PSTN), or public land mobile network (PLMN)) or a SS7 network 1160. Moreover, CS gateway node(s) 1112 interfaces CS-based traffic and signaling and gateway node(s) 1118.

In addition to receiving and processing CS traffic and signaling, gateway node(s) 1118 can authorize and authenticate PS-based data sessions with served (e.g., through macro RAN) wireless devices. Data sessions can include traffic exchange with networks external to the macro network platform 1120, like wide area network(s) (WANs) 1150; it should be noted that local area network(s) (LANs) can also be interfaced with macro network platform 1120 through gateway node(s) 1118. Gateway node(s) 1118 generates packet data contexts when a data session is established. It should be further noted that the packetized communication can include multiple flows that can be generated through server(s) 1114. Macro network platform 1120 also includes serving node(s) 1116 that convey the various packetized flows of information, or data streams, received through gateway node(s) 1118. It is to be noted that server(s) 1114 can include one or more processor configured to confer at least in part the functionality of macro network platform 1120. To that end, the one or more processor can execute code instructions stored in memory 1130, for example.

In example wireless environment 1100, memory 1130 stores information related to operation of macro network platform 1120. Information can include business data associated with subscribers; market plans and strategies, e.g., promotional campaigns, business partnerships; operational data for mobile devices served through macro network platform; service and privacy policies; end-user service logs for law enforcement; and so forth. Memory 1130 can also store information from at least one of telephony network(s) 1140, WAN(s) 1150, or SS7 network 1160.

Small cell gateway node(s) 1184 have substantially the same functionality as PS gateway node(s) 1118. Additionally, small cell gateway node(s) 1184 can also include substantially all functionality of serving node(s) 1116. In an aspect, small cell gateway node(s) 1184 facilitates handover resolution, e.g., assessment and execution. Server(s) 1182 have substantially the same functionality as described in connection with server(s) 1114 and can include one or more processors configured to confer at least in part the functionality of macro network platform 1120. Moreover, network server 314 can be part of server(s) 1182 and/or 1114. Further, the one or more processor can execute code instructions stored in memory 1186, for example.

Memory 1186 can include information relevant to operation of the various components of small cell network platform 110. For example operational information that can be stored in memory 1186 can comprise, but is not limited to, subscriber information; contracted services; maintenance and service records; small cell configuration (e.g., devices served through small cell RAN 1190; access control lists, or white lists); service policies and specifications; privacy policies; add-on features; small cell measurement data, and so forth Referring now to FIG. 12, there illustrated is a block diagram of a UE 1200 suitable for utilizing augmented neighbor lists to facilitate inbound handovers in accordance with the embodiments. Moreover, UE 1200 can be substantially similar to UEs 104 and 1175, and can include functionality, as more fully described herein with respect to UEs 104 and 1175 in systems 100-700 and 1100.

The UE 1200 can include a processor 1202 for controlling all onboard operations and processes. A memory 1204 can interface to the processor 1202 for storage of data and one or more applications 1206 being executed by the processor 1202. In an aspect, memory 1204 can include data store 304 that stores configuration parameters received from a serving access point. A communications component 1208 can interface to the processor 1202 to facilitate wired/wireless communication with external systems (e.g., small cell and macrocell). The communications component 1208 interfaces to a location component 1209 (e.g., GPS transceiver) that can facilitate location detection of the UE 1200. Note that the location component 1209 can also be included as part of the communications component 1208.

The UE 1200 can include a display 1210 for displaying content downloaded and/or for displaying text information related to operating and using the device features. A serial I/O interface 1212 is provided in communication with the processor 1202 to facilitate serial communication (e.g., USB, and/or IEEE 1394) via a hardwire connection. Audio capabilities are provided with an audio I/O component 1214, which can include a speaker for the output of audio signals related to, for example, recorded data or telephony voice data, and a microphone for inputting voice signals for recording and/or telephone conversations. In addition, the UE 1200 can include sensors 1230, such as, but not limited to an accelerometer, a gyroscope, etc. that can facilitate determination of the UE's speed.

Further, the UE 1200 can include a slot interface 1216 for accommodating a subscriber identity module (SIM) 1218. Firmware 1220 is also provided to store and provide to the processor 1202 startup and operational data. The UE 1200 can also include an image capture component 1222 such as a camera and/or a video decoder 1224 for decoding encoded multimedia content. The UE 1200 can also include a power source 1226 in the form of batteries, which power source 1226 interfaces to an external power system or charging equipment via a power I/O component 1228. In addition, the UE 1200 can include an event detection component 306, a speed determination component 402, a timer component 404, and/or a preference determination component 602, which can include respective functionality, as more fully described herein, for example, with regard to systems 100-600.

Figure 13:
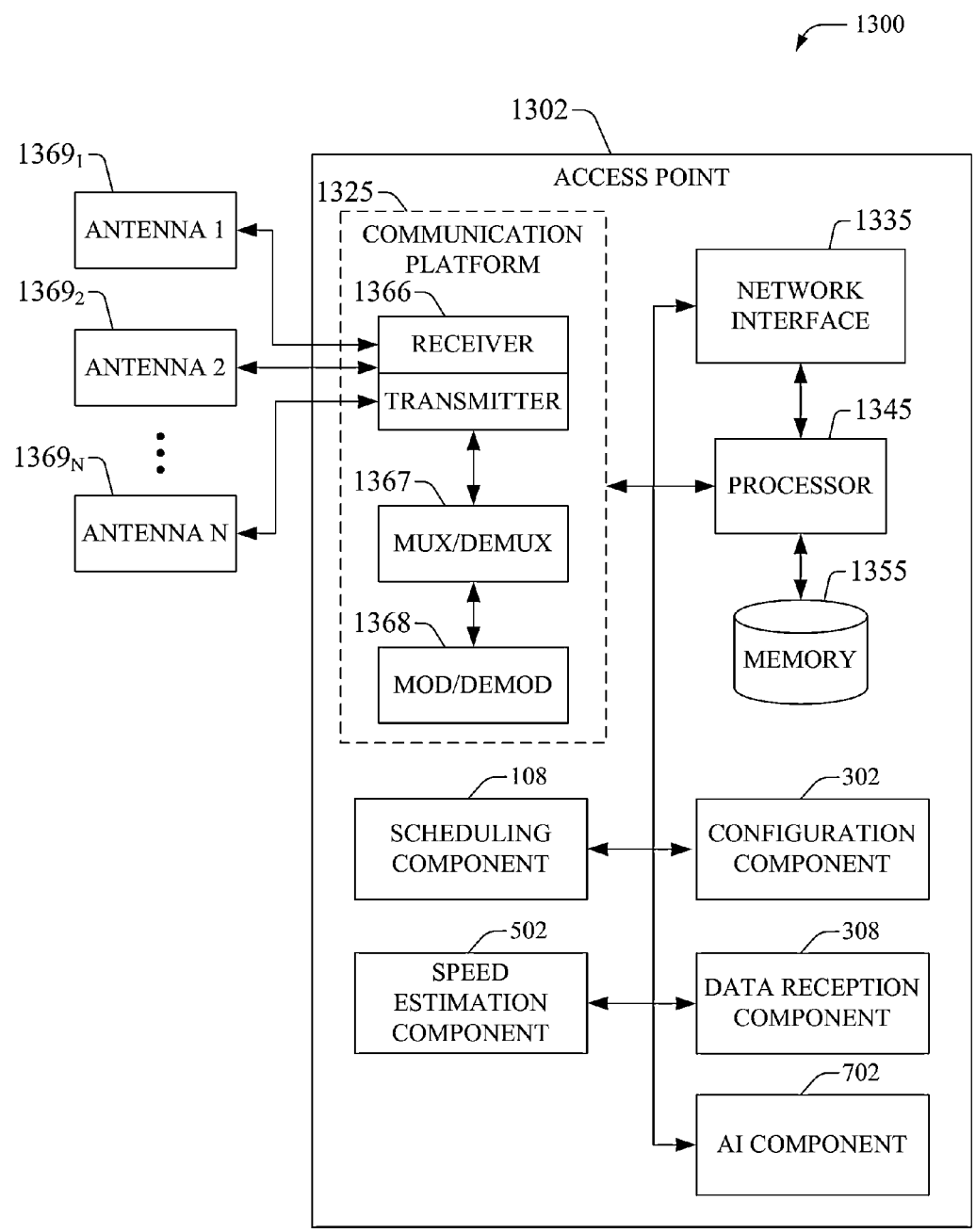
FIG. 13 illustrates an example block diagram of an access point suitable for small cell deployment scheduling based on UE speed and/or power data.

FIG. 13 illustrates an example embodiment 1300 comprising an access point 1302 that facilitates small cell deployment scheduling. As an example, the serving access point 102, the macro access point 202, and/or the small cell access point 204 disclosed herein with respect to system 100-700 can each include at least a portion of the access point 1302. In one aspect, the access point 1302 can receive and transmit signal(s) (e.g., traffic and control signals) from and to wireless devices, access terminals, wireless ports and routers, etc., through a set of antennas $1369_1$-$1369_N$. It should be appreciated that while antennas $1369_1$-$1369_N$ are a part of communication platform 1325, which comprises electronic components and associated circuitry that provides for processing and manipulating of received signal(s) (e.g., a packet flow) and signal(s) (e.g., a broadcast control channel) to be transmitted. In an aspect, communication platform 1325 can include a transmitter/receiver (e.g., a transceiver) 1366 that can convert signal(s) from analog format to digital format (e.g., analog-to-digital conversion) upon reception, and from digital format to analog (e.g., digital-to-analog conversion) format upon transmission. In addition, receiver/transmitter 1366 can divide a single data stream into multiple, parallel data streams, or perform the reciprocal operation. Coupled to transceiver 1366 is a multiplexer/demultiplexer 1367 that facilitates manipulation of signal in time and/or frequency space. Electronic component 1367 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM), etc. In addition, mux/demux component 1367 can scramble and spread information (e.g., codes) according to substantially any code known in the art; e.g., Hadamard-Walsh codes, Baker codes, Kasami codes, polyphase codes, and so on. A modulator/demodulator 1368 is also a part of operational group 1325, and can modulate information according to multiple modulation techniques, such as frequency modulation, amplitude modulation (e.g., M-ary quadrature amplitude modulation (QAM), with M a positive integer), phase-shift keying (PSK), and the like.

Access point 1302 also includes a processor 1345 configured to confer functionality, at least partially, to substantially any electronic component in the access point 1302, in accordance with aspects of the subject disclosure. In particular, processor 1345 can facilitate implementing configuration instructions received through communication platform 1325, which can include storing data in memory 1355. In addition, processor 1345 facilitates processing data (e.g., symbols, bits, or chips, etc.) for multiplexing/demultiplexing, such as effecting direct and inverse fast Fourier transforms, selection of modulation rates, selection of data packet formats, inter-packet times, etc. Moreover, processor 1345 can manipulate antennas $1369_1$-$1369_N$ to facilitate beamforming or selective radiation pattern formation, which can benefit specific locations covered by the access point 1302; and exploit substantially any other advantages associated with smart-antenna technology. Memory 1355 can store data structures, code instructions, system or device information like device identification codes (e.g., International Mobile Station Equipment Identity (IMEI), Mobile Station International Subscriber Directory Number (MSISDN), serial number . . . ) and specification such as multimode capabilities; code sequences for scrambling; spreading and pilot transmission, floor plan configuration, access point deployment and frequency plans; and so on. Moreover, memory 1355 can store configuration information such as schedules and policies; geographical indicator(s); network load data, scheduling and/or resource allocation policies; historical logs, and so forth.

In embodiment 1300, processor 1345 can be coupled to the memory 1355 in order to store and retrieve information necessary to operate and/or confer functionality to communication platform 1325, network interface 1335 (e.g., that coupled the access point to core network devices such as but not limited to a network controller), and other operational components (e.g., multimode chipset(s), power supply sources . . . ; not shown) that support the access point 1302. The access point 1302 can further include a scheduling component 108, a configuration component 302, a data reception component 308, a speed estimation component 502, and/or an AI component 702 which can include functionality, as more fully described herein, for example, with regard to systems 100-700. In addition, it is to be noted that the various aspects disclosed in the subject specification can also be implemented through (i) program modules stored in a computer-readable storage medium or memory (e.g., memory 1355) and executed by a processor (e.g., processor 1345), or (ii) other combination(s) of hardware and software, or hardware and firmware.

Figure 14:
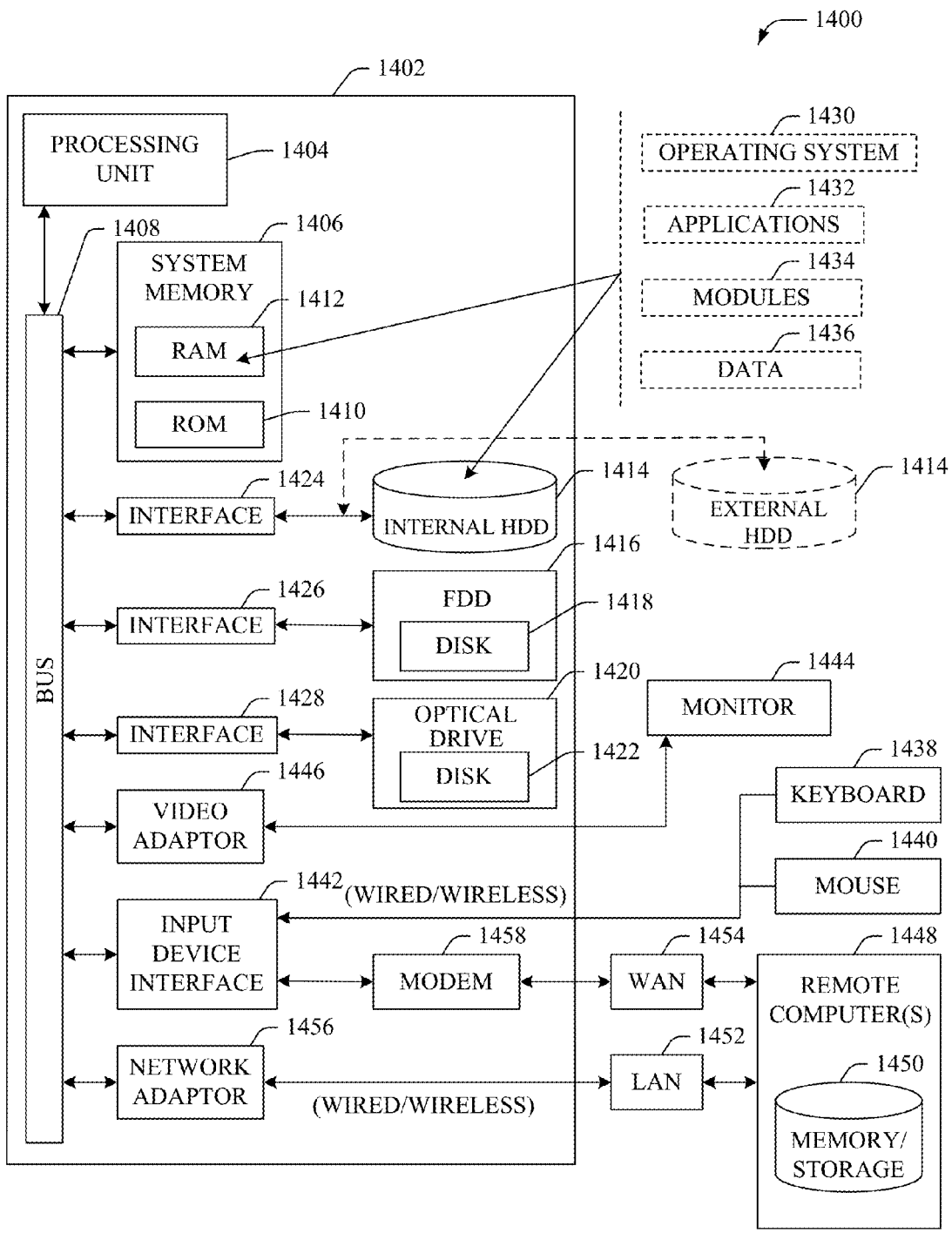
FIG. 14 illustrates a block diagram of a computer operable to execute the disclosed communication architecture.

Referring now to FIG. 14, there is illustrated a block diagram of a computer operable to execute the disclosed communication architecture. In order to provide additional context for various aspects of the subject specification, FIG. 14 and the following discussion are intended to provide a brief, general description of a suitable computing environment 1400 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various aspects of the specification includes a computer 1402, the computer 1402 including a processing unit 1404, a system memory 1406 and a system bus 1408. As an example, the equipment, gateway(s), access point(s), component(s), server(s), node(s), interface(s), and platform(s) (e.g., serving access point 102, UE 104, scheduling component 108, configuration component 302, event detection component 306, data reception component 308, speed determination component 402, timer component 404, speed estimation component 502, preference determination component 602, and/or AI component 702, etc.) disclosed herein with respect to system 100-700 can each include at least a portion of the computer 1402. In another example, a combination of the equipment, gateway(s), access point(s), component(s), server(s), node(s), interface(s), and platform(s) can each include one or more computers such as, or substantially similar to, computer 1402. Further, each of the network element(s) (stand alone and/or in combination with one or more other network elements) disclosed herein with respect to systems 1100 can include at least a portion of computer 1402, or can include one or more computers such as, or substantially similar to, computer 1402. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), which internal hard disk drive 1414 can also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is appreciated that the specification can be implemented with various commercially available operating systems or combinations of operating systems.

A user can enter commands and information into the computer 1402 through one or more wired/wireless input devices, e.g., a keyboard 1438 and a pointing device, such as a mouse 1440 or a touchscreen or touchpad (not illustrated). These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc. A monitor 1444 or other type of display device is also connected to the system bus 1408 via an interface, such as a video adapter 1446.

The computer 1402 can operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 is connected to the local network 1452 through a wired and/or wireless communication network interface or adapter 1456. The adapter 1456 can facilitate wired or wireless communication to the LAN 1452, which can also include a wireless access point disposed thereon for communicating with the wireless adapter 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are example and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A serving access point device of a communication network, comprising:
   a memory having stored instructions; and
   a processor configured to execute the instructions to perform operations, the operations comprising:
   receiving scheduling data from a user equipment, wherein the scheduling data comprises speed data indicative of a movement history of the user equipment, and power data indicative of a power consumption preference of the user equipment, facilitating a scheduling of a transmission between the user equipment and the serving access point device and another access point device based on the scheduling data, wherein one of the serving access point device and the another access point device is a small cell and another of the serving access point device and another access point device is a wide cell of a heterogeneous network,
   selectively enabling a Cell Range Extension (CRE) bias toward the small cell based on both the speed data and the power data; and
   based on the speed data and the power data, selectively scheduling the transmission via an Almost Blank Sub-frame (ABS) in which a transmission of a control channel is blanked.

2. The serving access point device of claim 1, wherein the facilitating comprises:
   enabling dual connectivity to facilitate a first connection between the user equipment and the serving access point device and a concurrent second connection between the user equipment and the another access point device of the communication network based on the scheduling data.

3. The serving access point device of claim 1, wherein the sub-frame is an absolute sub-frame.

4. The serving access point device of claim 1, wherein the facilitating comprises:
   scheduling the transmission via the ABS when the speed data indicates that the user equipment is moving below a speed threshold and the power data indicates that the user equipment prefers low power consumption.

5. The serving access point device of claim 1, wherein the facilitating comprises:
   scheduling the transmission via a non-ABS when the speed data indicates that the user equipment is moving above a speed threshold.

6. The serving access point device of claim 1, wherein the movement history of the user equipment comprises at least one of a physical speed of the user equipment, a number of cell changes performed by the user equipment within a specified period of time, or a time period for which the user equipment was coupled to a previous cell.

7. The serving access point device of claim 1, wherein the operations further comprise:
   instructing the user equipment to prohibit a transmission of the scheduling data during a time period that a cell timer has not expired.

8. The serving access point device of claim 1, wherein the power consumption preference of the user equipment is indicative of whether the user equipment needs to conserve battery power.

9. The serving access point device of claim 1, wherein the power consumption preference of the user equipment is indicative of whether the user equipment has sufficient battery power.

10. The serving access point device of claim 1, wherein the power data comprises a bit that in response to being reset indicates that transmission power of the user equipment is to be conserved.

11. The serving access point device of claim 10, wherein the power data comprises a set of bits that represent a priority associated with conservation of the transmission power.

12. The serving access point device of claim 10, wherein the bit is reset in response to at least one of the user equipment being determined to be connected to a power source, a power level of a battery of the user equipment being determined to satisfy a power criterion, a Wi-Fi module of the user equipment is determined to be switched off, an application of the user equipment is determined to request a data rate that satisfies a data rate criterion, or a display screen of the user equipment is determined to be switched on.

13. The serving access point device of claim 1, wherein the movement history of the user equipment comprises speed data that represents a speed of the user equipment.

14. The serving access point device of claim 1, wherein the operations further comprise:
   based on the scheduling data, directing coordination data to the another access point device of the communication network to facilitate resource allocation.

15. The serving access point device of claim 1, wherein the receiving comprises receiving the scheduling data from a network device of the communication network.

16. The serving access point device of claim 1, wherein the operations further comprise:
   directing, to the user equipment, configuration data that is indicative of a reporting trigger that is to be employed to initiate a transmission of the scheduling data.

17. The serving access point device of claim 1, wherein the facilitating comprises instructing the user equipment to connect to the wide cell in a single connection mode with non-Almost Blank Subframe (ABS) transmissions when the speed data indicates that the user equipment is moving above a predetermined speed and the power data indicates that the user equipment prefers low power consumption.

18. The serving access point device of claim 1, wherein the facilitating comprises instructing the user equipment to disable dual connection mode when the power consumption preference indicates a low power consumption preference.

19. The serving access point device of claim 1, wherein the facilitating comprises instructing the user equipment to enable the Cell Range Extension (CRE) bias toward the small cell and transmissions via an Almost Blank Subframe (ABS) when the power consumption preference indicates a low power consumption preference and the speed data indicates that the user equipment is moving below a speed threshold.

20. A method, comprising:
   receiving, by an access point device of a communication network that comprises a processor, scheduling data associated with a user equipment, the scheduling data comprising speed data indicative of a movement history of the user equipment, and wherein the scheduling data further comprises power data indicative of a power consumption preference of the user equipment;
   facilitating a scheduling of a transmission between the user equipment and the serving access point device and another access point device based on the scheduling data, wherein one of the serving access point device and the another access point device is a small cell and another of the serving access point device and another access point device is a wide cell of a heterogeneous network;

selectively enabling a Cell Range Extension (CRE) bias toward the small cell based on both the speed data and the power data; and based on the speed data and the power data, selectively scheduling the transmission via an Almost Blank Sub-frame (ABS) in which a transmission of a control channel is blanked.

21. The method of claim 20, wherein the receiving comprises receiving speed data that represents a speed of the user equipment.

22. The method of claim 21, wherein the facilitating comprises:

enabling dual connectivity to facilitate a first connection between the user equipment and the serving access point device and concurrently facilitate a second connection between the user equipment and the another access point device of the communication network, in response to determining that the speed data indicates that the user equipment is moving below a speed threshold and the power data indicates that the user equipment does not prefer low power consumption.

23. The method of claim 22 further comprising:

scheduling the transmission via a non-ABS in which a transmission of a control channel is not blanked in response to determining that dual connectivity is enabled.

24. The method of claim 23, wherein the sub-frame is an absolute sub-frame.

25. The method of claim 21, wherein the facilitating comprises:

enabling single connectivity to facilitate one of a first connection between the user equipment and the serving access point device or a second connection between the user equipment and the another access point device of the communication network, in response to determining that the speed data indicates that the user equipment is moving below a speed threshold and the power data indicates that the user equipment prefers low power consumption.

26. The method of claim 25 further comprising:

scheduling the transmission via the ABS in response to determining that single connectivity is enabled.

27. The method of claim 26, wherein the sub-frame is an absolute sub-frame.

28. The method of claim 20, wherein the power consumption preference of the user equipment is indicative of whether the user equipment needs to conserve battery power.

29. The method of claim 20, wherein the power consumption preference of the user equipment is indicative of whether the user equipment has sufficient battery power.

30. The method of claim 20, wherein the facilitating comprises instructing the user equipment to connect to the wide cell in a single connection mode with non-Almost Blank Subframe (ABS) transmissions when the speed data indicates that the user equipment is moving above a predetermined speed and the power data indicates that the user equipment prefers low power consumption.

31. The method of claim 20, wherein the facilitating comprises instructing the user equipment to disable dual connection mode when the power consumption preference indicates a low power consumption preference.

32. The method of claim 20, wherein the facilitating comprises instructing the user equipment to enable the Cell Range Extension (CRE) bias toward the small cell and transmissions via an Almost Blank Subframe (ABS) when the power consumption preference indicates a low power consumption preference and the speed data indicates that the user equipment is moving below a speed threshold.

33. A computer-readable storage device comprising computer-executable instructions that, in response to execution, cause a system comprising a processor to perform operations, the operations comprising:

determining scheduling data associated with a user equipment, wherein the scheduling data comprises speed data indicative of a movement history of the user equipment, and wherein the scheduling data further comprises power data indicative of a power consumption preference of the user equipment; and directing the scheduling data to an access point device serving the user equipment to facilitate scheduling of a transmission between the user equipment and the serving access point device and another access point device based on the scheduling data, wherein one of the serving access point device and the another access point device is a small cell and another of the serving access point device and another access point device is a wide cell of a heterogeneous network, wherein the transmission is scheduled by selectively enabling a Cell Range Extension (CRE) bias toward the small cell based on both the speed data and the power data, and the transmission is selectively scheduled via an Almost Blank Sub-frame (ABS) in which a transmission of a control channel is blanked based on the speed data and the power data.

34. The computer-readable storage device of claim 33, wherein the movement history of the user equipment comprises at least one of a physical speed of the user equipment, a number of cell changes performed by the user equipment within a specified period of time, or a time period for which the user equipment was coupled to a previous cell.

35. The computer-readable storage device of claim 33, wherein the directing comprises directing the speed data via a radio resource control message.

36. The computer-readable storage device of claim 33, wherein the facilitating comprises instructing the user equipment to connect to the wide cell in a single connection mode with non-Almost Blank Subframe (ABS) transmissions when the speed data indicates that the user equipment is moving above a predetermined speed and the power data indicates that the user equipment prefers low power consumption.

37. The computer-readable storage device of claim 33, wherein the facilitating comprises instructing the user equipment to disable dual connection mode when the power consumption preference indicates a low power consumption preference.

38. The computer-readable storage device of claim 33, wherein the facilitating comprises instructing the user equipment to enable the Cell Range Extension (CRE) bias toward the small cell and transmissions via an Almost Blank Sub-frame (ABS) when the power consumption preference indicates a low power consumption preference and the power data indicates that the user equipment is moving below a speed threshold.

39. A mobile device comprising:
a memory having stored instructions; and
a processor configured to execute the instructions to perform operations, the operations comprising:
  determining scheduling data associated with the mobile device, wherein the scheduling data comprises speed data indicative of a movement history of mobile device, and wherein the scheduling data further comprises power data indicative of a power consumption preference of the mobile device; and
directing the scheduling data to an access point device serving the mobile device to facilitate scheduling of a transmission between the mobile device and a serving access point device and another access point device based on the scheduling data, wherein the one of the serving access point device and the another access point device is a small cell and another of the serving access point device and another access point device is a wide cell of a heterogeneous network, wherein the transmission is scheduled by selectively enabling a Cell Range Extension (CRE) bias toward the small cell based on both the speed data and the power data, and the transmission is selectively scheduled via an Almost Blank Sub-frame (ABS) in which a transmission of a control channel is blanked based on the speed data and the power data.

40. The mobile device of claim 39, wherein the speed data comprises a speed at which the mobile device is moving.

41. The mobile device of claim 39, wherein the movement history of the mobile device comprises at least one of a physical speed of the user equipment, a number of cell changes performed by the mobile device within a specified period of time, or a time period for which the mobile device was coupled to a previous cell.

42. The mobile device of claim 39, wherein the power consumption preference of the user equipment is indicative of whether the user equipment needs to conserve battery power.

43. The mobile device of claim 39, wherein the power consumption preference of the mobile device is indicative of whether the user equipment has sufficient battery power.

44. The mobile device of claim 39, wherein the power data is indicative of at least one of the mobile device being determined to be connected to a power source, a power level of a battery of the user equipment, a Wi-Fi module of the user equipment being determined to be switched off, a data rate requested by an application of the mobile device, or a display screen of the user equipment being determined to be switched on.

45. The mobile device of claim 39, wherein the facilitating comprises instructing the user equipment to connect to the wide cell in a single connection mode with non-Almost Blank Subframe (ABS) transmissions when the speed data indicates that the user equipment is moving above a predetermined speed and the power data indicates that the user equipment prefers low power consumption.

46. The mobile device of claim 39, wherein the facilitating comprises instructing the user equipment to disable dual connection mode when the power consumption preference indicates a low power consumption preference.

47. The mobile device of claim 39, wherein the facilitating comprises instructing the user equipment to enable the Cell Range Extension (CRE) bias toward the small cell and transmissions via an Almost Blank Subframe (ABS) when the power consumption preference indicates a low power consumption preference and the power data indicates that the user equipment is moving below a speed threshold.

* * * * *